US012804504B2

(12) United States Patent
Chai et al.

(10) Patent No.: US 12,804,504 B2
(45) Date of Patent: Nov. 17, 2026

(54) COORDINATION METHOD AND DEVICE FOR SERVICE TRANSMISSION

(71) Applicants: China Mobile Communication Co., Ltd Research Institute, Beijing (CN); China Mobile Communications Group Co., Ltd., Beijing (CN)

(72) Inventors: Li Chai, Beijing (CN); Xiaodong Xu, Beijing (CN); Nan Hu, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 238 days.

(21) Appl. No.: 18/718,656

(22) PCT Filed: Dec. 30, 2022

(86) PCT No.: PCT/CN2022/143852

§ 371 (c)(1),
(2) Date: Jun. 11, 2024

(87) PCT Pub. No.: WO2023/125914

PCT Pub. Date: Jul. 6, 2023

(65) Prior Publication Data

US 2025/0056366 A1 Feb. 13, 2025

(30) Foreign Application Priority Data

Dec. 31, 2021 (CN) ......................... 202111660854.9

(51) Int. Cl.
*H04W 76/27* (2018.01)
*H04W 36/36* (2009.01)

(52) U.S. Cl.
CPC ......... *H04W 36/362* (2023.05); *H04W 76/27* (2018.02)

(58) Field of Classification Search
CPC ................. H04W 36/08; H04W 36/24; H04W 36/362; H04W 76/27
See application file for complete search history.

(56) References Cited

U.S. PATENT DOCUMENTS

| | | | |
|---|---|---|---|
| 2013/0017779 A1 | 1/2013 | Song et al. | |
| 2015/0341213 A1 | 11/2015 | Feng et al. | |

(Continued)

FOREIGN PATENT DOCUMENTS

| | | | |
|---|---|---|---|
| CN | 103067403 A | 4/2013 | |
| CN | 104125560 A | 10/2014 | |

(Continued)

OTHER PUBLICATIONS

CMCC, "CMCC views on Rel-18", 3GPP TSG RAN Rel-18 workshop, RWS-210331, Electronic Meeting, Jun. 28-Jul. 2, 2021, Mobile Competence Centre ; 650, Route Des Lucioles ; F-06921 Sophia-Antipolis Cedex ; France.

(Continued)

*Primary Examiner* — Sam Bhattacharya
(74) *Attorney, Agent, or Firm* — Price Heneveld LLP

(57) ABSTRACT

Provided are a coordination method for service transmission and a device. The method includes: a first UE transmits first information to an RAN node, receives first configuration information from the RAN node, and performs configuration according to the first configuration information, the first configuration information including at least one of layer 2 configuration, physical resource information, or configuration of a first common logical layer between the first UE and an associated UE; the first information includes at least one of: an identifier of UE associated with the first UE, the quantity of associated UE being at least one, a first link for data and/or signaling transmission existing between the first UE and associated UE; type of the first link; latency of the first link; an association relationship with respect to a first (Continued)

service between the first UE and associated UE; or whether the associated UE is exempt from security verification.

20 Claims, 3 Drawing Sheets

(56) References Cited

U.S. PATENT DOCUMENTS

| | | | | |
|---|---|---|---|---|
| 2017/0273055 | A1 | 9/2017 | Xu et al. | |
| 2018/0242115 | A1 | 8/2018 | Kim et al. | |
| 2019/0349719 | A1* | 11/2019 | Pattan | H04W 4/08 |
| 2020/0195323 | A1 | 6/2020 | Black et al. | |
| 2020/0288283 | A1 | 9/2020 | Li et al. | |
| 2022/0006493 | A1 | 1/2022 | Wang et al. | |
| 2022/0418015 | A1* | 12/2022 | Paladugu | H04L 5/0048 |
| 2023/0014030 | A1 | 1/2023 | Li et al. | |

FOREIGN PATENT DOCUMENTS

| | | | |
|---|---|---|---|
| CN | 109842508 | A | 6/2019 |
| CN | 111432469 | A | 7/2020 |
| CN | 113169765 | A | 7/2021 |
| CN | 113596706 | A | 11/2021 |
| JP | 2014525196 | A | 9/2014 |
| WO | 2013103202 | A1 | 7/2013 |
| WO | 2017030348 | A1 | 2/2017 |

OTHER PUBLICATIONS

Second Canadian Office Action for Canada Patent Application No. 3,244,457 mailed Nov. 10, 2025, 5 pages.

First Indian Office Action for Indian Patent Application No. 202427046526, dispatched Jun. 17, 2026, 9 pages.

* cited by examiner

COORDINATION METHOD AND DEVICE FOR SERVICE TRANSMISSION

CROSS-REFERENCE TO RELATED APPLICATION

This application is a U.S. national phase application of a PCT Application No. PCT/CN2022/143852 filed on Dec. 30, 2022, which claims priority to Chinese Patent Application No. 202111660854.9 filed in China on Dec. 31, 2021, the disclosures of which are incorporated by reference herein in their entireties.

TECHNICAL FIELD

The present disclosure relates to the technical field of mobile communications, and in particular to a coordination method for service transmission and a device.

BACKGROUND

In related communication technologies, handover mostly refers to that user equipment (UE) is handed over between different radio access network (RAN) nodes (such as base stations) when the UE is moving. However, in practical applications, a single user may possess multiple UEs, and a need to migrate a service that is being performed on one UE to another UE may arise. For example, a user may have a mobile phone and a smart watch, and in a case that the user is making a call on the mobile phone, and meanwhile wants to go for a jog but does not want to carry the mobile phone, the user may wish to continue the call on the smart watch. For another example, a certain user may have a mobile phone and a vehicle-mounted terminal, and in a case that the user is making a call while getting in the vehicle, the user may wish to continue the call on the vehicle-mounted terminal. These scenarios bring about a demand for inter-UE handover.

In the related technologies, the above migration process is usually realized by changing roles of a primary UE and a secondary UE. A risk associated with the method lies in that the primary UE needs to transmit some key information to the secondary UE through a protocol such as Bluetooth, and the key information may be compromised. In addition, this method realizes inter-UE handover based on an interface between UEs or realizes inter-UE handover in a network-agnostic manner, and generally requires the two UEs to support information exchange based on a short-range communication protocol. The requirement may be impossible to meet when the two UEs are products of different brands or manufacturers. Thus, this method is not universally applicable.

In addition, UE in the related technologies has limited power. For example, maximum transmitting powers of existing UEs are typically 23 dBm and 26 dBm. It is increasingly difficult to further increase the maximum transmitting power, while the demand for uplink transmission is becoming stronger. Therefore, a need to aggregate multiple UEs (UE aggregation) arises, so as to increase a transmitting power of aggregated UEs and further improve uplink coverage or uplink throughput after aggregation, thereby effectively alleviating the current difficulties. The related technologies achieve the UE aggregation through service customization, wherein IP addresses of two UEs are mapped to each other at the application layer, and then data flow control is performed at the application layer. The disadvantage thereof is that this method is only applicable to customized services, and cannot be applied to more applications.

Therefore, there is an urgent need for a solution for coordinating inter-UE service transmission, which can expand the application range of inter-UE service coordination technology and improve the universal applicability thereof.

SUMMARY

At least one embodiment of the present disclosure provides a coordination method for service transmission and a device, so as to improve the applicability of an inter-UE service coordination technology.

In order to solve the above technical problem, the present disclosure is implemented as follows.

In a first aspect, an embodiment of the present disclosure provides a coordination method for service transmission, which includes:

- transmitting, by a first UE, first information to a radio access network node, where the first information includes at least one of the following:
- an identifier of an associated UE having an association relationship with the first UE, where a quantity of the associated UE is at least one, and a first link for data and/or signaling transmission exists between the first UE and the associated UE;
- a type of the first link between the first UE and the associated UE;
- latency information of the first link between the first UE and the associated UE;
- the association relationship between the first UE and the associated UE that is with respect to a first service;
- whether the associated UE is exempt from security verification; and
- receiving, by the first UE, first configuration information transmitted by the radio access network node, and performing, by the first UE, corresponding configuration according to the first configuration information, wherein the first configuration information includes at least one of layer 2 configuration information, physical resource information, or configuration information of a first common logical layer between the first UE and the associated UE.

In a second aspect, an embodiment of the present disclosure provides a coordination method for service transmission, which includes:

- receiving, by a radio access network node, first information transmitted by a first UE, where the first information includes at least one of the following:
- an identifier of an associated UE having an association relationship with the first UE, where a quantity of the associated UE is at least one, and a first link for data and/or signaling transmission exists between the first UE and the associated UE;
- a type of the first link between the first UE and the associated UE;
- latency information of the first link between the first UE and the associated UE;
- the association relationship between the first UE and the associated UE that is with respect to a first service;
- whether the associated UE is exempt from security verification; and
- configuring, by the radio access network node, a second common logical layer corresponding to the associated UE for the first service, and transmitting, by the radio access network node, first configuration information to the first UE and the associated UE, to configure the associated UE, wherein the first configuration information includes at least one of layer 2 configuration information, physical resource information, or configuration information of a first common logical layer between the first UE and the associated UE.

In a third aspect, an embodiment of the present disclosure provides a user equipment, including a transceiver and a processor. The transceiver is configured to transmit first information to a radio access network node, wherein the first information includes at least one of the following:

an identifier of an associated UE having an association relationship with the first UE, wherein a quantity of the associated UE is at least one, and a first link for data and/or signaling transmission exists between the first UE and the associated UE;

a type of the first link between the first UE and the associated UE;

latency information of the first link between the first UE and the associated UE;

the association relationship between the first UE and the associated UE that is with respect to a first service;

whether the associated UE is exempt from security verification.

The processor is configured to receive first configuration information transmitted by the radio access network node, and perform corresponding configuration according to the first configuration information, wherein the first configuration information includes at least one of layer 2 configuration information, physical resource information, or configuration information of a first common logical layer between the first UE and the associated UE.

In a fourth aspect, an embodiment of the present disclosure provides a user equipment, including: a processor, a memory, and a program stored in the memory and executable by the processor, wherein the program is configured to be executed by the processor to perform steps of the method as described in the first aspect.

In a fifth aspect, an embodiment of the present disclosure provides a radio access network node, including a transceiver and a processor. The transceiver is configured to receive first information transmitted by a first UE, wherein the first information includes at least one of the following:

an identifier of an associated UE having an association relationship with the first UE, wherein a quantity of the associated UE is at least one, and a first link for data and/or signaling transmission exists between the first UE and the associated UE;

a type of the first link between the first UE and the associated UE;

latency information of the first link between the first UE and the associated UE;

the association relationship between the first UE and the associated UE that is with respect to a first service;

whether the associated UE is exempt from security verification.

The processor is configured to configure a second common logical layer corresponding to the associated UE for the first service, and transmit first configuration information to the first UE and the associated UE, to configure the associated UE, wherein the first configuration information includes at least one of layer 2 configuration information, physical resource information, or configuration information of a first common logical layer between the first UE and the associated UE.

In a sixth aspect, an embodiment of the present disclosure provides a radio access network node, including: a processor, a memory, and a program stored in the memory and executable by the processor, where the program is configured to be executed by the processor to perform steps of the method as described in the second aspect.

In a seventh aspect, an embodiment of the present disclosure provides a computer-readable storage medium, on which a program is stored, and when the program is executed by a processor, steps of the above method are implemented.

Compared with related technologies, in the coordination method for service transmission and device provided by the embodiments of the present disclosure, a first UE reports first information related to an associated UE, and performs corresponding configuration between the associated UEs with the aid of a radio access network node, which can provide support for service coordination between UEs of different manufacturers/different brands, thereby improving the applicability of inter-UE service transmission coordination technology.

BRIEF DESCRIPTION OF THE DRAWINGS

By reading detailed description of preferred implementations below, multiple other advantages and benefits will become clear to person of ordinary skills in the art. The accompanying drawings are only intended to illustrate the preferred implementations and are not constructed as a limitation on the present disclosure. Throughout the drawings, a same component is represented by a same reference sign. In the drawings.

DETAILED DESCRIPTION

Figure 1:
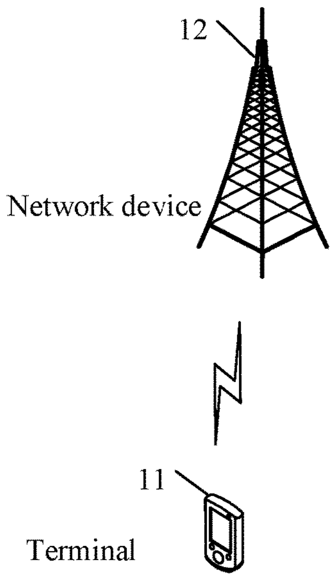
FIG. 1 is a schematic diagram of an application scenario of an embodiment of the present disclosure.

Exemplary embodiments of the present disclosure will be described in more detail below with reference to the accompanying drawings. Although the exemplary embodiments of the present disclosure are illustrated in the accompanying drawings, it should be appreciated that the present disclosure can be implemented in various forms and should not be limited by the embodiments described here. On the contrary, these embodiments are provided to facilitate a more thorough understanding of the present disclosure and to fully convey the scope of the present disclosure to those skilled in the art.

Terms "first", "second" and the like in the description and claims of the present disclosure are used to distinguish similar objects, without necessarily describing a specific sequence or order. It should be appreciated that the data used in this way can be interchanged in appropriate cases, so that the embodiments described herein can be implemented, for example, in an order other than that illustrated or described here. In addition, terms "include" and "have" and any variant thereof are intended to cover nonexclusive inclusions. For example, a process, method, system, product or device including a series of steps or units is not limited to those steps or units which are clearly listed, and may include other steps or units which are not clearly listed or intrinsic to the process, the method, the product or the device. The term "and/or" used in the description and claims refers to at least one of objects connected by the term.

The technology described in this specification is not limited to the NR system and long time evolution (LTE)/LTE-Advanced (LTE-A) system, but also can be used in various wireless communication systems, such as code division multiple access (CDMA), time division multiple access (TDMA), frequency division multiple access (FDMA), orthogonal frequency division multiple access (OFDMA), single-carrier frequency-division multiple access (SC-FDMA) and other systems. Usually, terms "system" and "network" may be interchangeably used. The CDMA system can implement wireless technologies such as CDMA2000 and universal terrestrial radio access (UTRA). UTRA includes wideband CDMA (Wideband Code Division Multiple Access, WCDMA) and other CDMA variants. The TDMA system can implement wireless technologies such as global system for mobile communication (GSM). OFDMA systems can implement wireless technologies such as ultra-mobile broadband (UMB), Evolution-UTRA (E-UTRA), IEEE 802.21 (Wi-Fi), IEEE 802.16 (WiMAX), IEEE 802.20, and Flash-OFDM. UTRA and E-UTRA are parts of universal mobile telecommunications system (UMTS). LTE and more advanced LTE (such as LTE-A) are new UMTS versions using E-UTRA. UTRA, E-UTRA, UMTS, LTE, LTE-A, and GSM are described in literatures from an organization called "$3^{rd}$ generation partnership project" (3GPP). CDMA2000 and UMB are described in literatures from an organization called "3rd Generation Partnership Project 2" (3GPP2). The technology described in this specification can be used not only for the systems and radio technologies mentioned above, but also for other systems and radio technologies. Furthermore, the NR system is described in the following description for example purposes, and the NR terminology is used in most of the following description, but these techniques can also be applied to other applications than the NR system applications.

The following description provides examples rather than limiting the scope, applicability, or configuration set forth in the claims. Changes can be made to the functionality and arrangement of the discussed elements without departing from the spirit and scope of this disclosure. Various procedures or components can be appropriately omitted, replaced, or added in multiple examples. For example, the described method can be executed in an order that is different from the described order, and various steps can be added, omitted, or combined. In addition, features described with reference to some examples can be combined in another example.

The term "data" mentioned in this specification may be one or more of: "packet", "physical uplink shared channel (PUSCH) transmission", "physical downlink shared channel (PDSCH) transmission", "data unit", "transmission", "transmission block".

The term "service" in this specification may represent at least one of the following concepts: service, protocol data unit (PDU) session, quality of service (QOS) flow, stream, service data flow, radio bearer, logical channel.

Referring to FIG. 1, FIG. 1 shows a block diagram of a wireless communication system to which an embodiment of the present disclosure is applicable. The wireless communication system includes a terminal 11 and a network device 12. The terminal 11 may also be referred to as user terminal or user equipment (UE), and the terminal 11 may be a mobile phone, a tablet personal computer, a laptop computer, a personal digital assistant (PDA), mobile Internet device (MID), wearable device, vehicle-mounted equipment, and other terminal-side devices. It should be noted that the specific type of terminal 11 is not limited in the embodiments of the present disclosure. The network device 12 may be a radio access network node and/or a core network element. The above radio access network node may be a radio access network node of 5G and a later version (for example, 5th Generation NodeB (gNB) or a 5G NR NB), or a radio access network node in another communications system (for example, eNB, wireless local area network (WLAN) access point, or other access points). The radio access network node may be referred to as a node B (NB), an evolved NodeB (eNB), an access point, a base transceiver station (BTS), a radio base station, a radio transceiver, a basic service set (BSS), an extended service set (ESS), a NodeB, a home NodeB, a home evolved NodeB, a WLAN access point, a Wi-Fi node, or another appropriate term in the art. As long as the same technical effect is achieved, the radio access network node is not limited to a specific technical term. It should be noted that the radio access network node in the NR system is only used as an example in the embodiments of the present disclosure, and a specific type of the radio access network node is not limited.

The radio access network node may communicate with the terminal 11 under the control of a controller of the radio access network node. In various examples, the controller of the radio access network node may be a part of a core network or a certain radio access network node. Some radio access network nodes can perform control information or user data communication with the core network through backhaul. In some examples, some of these radio access network nodes may communicate with each other directly or indirectly via a backhaul link, and the backhaul link may be a wired or wireless communication link. A wireless communication system may support operation on multiple carriers (waveform signals of different frequencies). A multi-carrier transmitter is capable of transmitting modulated signals on the multiple carriers simultaneously. For example, each communication link may be multi-carrier signals modulated according to various radio technologies. Each modulated signal may be transmitted on a different carrier and may carry control information (for example, reference signal, control channel and the like), overhead information, data, etc.

The radio access network node may communicate wirelessly with the terminal 11 via one or more access point antennas. Each radio access network node may provide communication coverage for its own coverage area. The coverage area of an access point may be divided into sectors that each constitute only a portion of the coverage area. A wireless communication system may include different types of radio access network nodes (e.g., macro base station, micro base station, or pico base station). Radio access network nodes may also adopt different radio technologies, such as cellular or WLAN radio access technologies. The radio access network node may be associated with a same access network or different access networks, or a same operator deployment or different operator deployments. The coverage areas of different radio access network nodes (including coverage areas of the same or different types of radio access network nodes, coverage areas of nodes adopting the same or different radio technologies, or coverage areas belonging to the same or different access networks) may overlap.

A communication link in a wireless communication system may include an uplink for carrying uplink (UL) transmission (for example, transmission from the terminal 11 to the network device 12), or a downlink for carrying downlink (DL) transmission (for example, transmission from the network device 12 to the terminal 11). The UL transmission may also be referred to as reverse link transmission, and the DL transmission may also be referred to as forward link transmission. The downlink transmission may be performed using a licensed frequency band, an unlicensed frequency band, or both of them. Similarly, the uplink transmission may be performed using a licensed frequency band, an unlicensed frequency band, or both of them.

As mentioned in the background, the inter-UE transmission coordination scheme in the related technologies generally achieves inter-UE handover based on a specific interface between UEs or in a network-agnostic manner, and often requires two UEs to support information exchange based on a specific short-range communication protocol, which can be difficult to achieve when the two UEs are of different brands or from different manufacturers, so this scheme is not universally applicable.

In order to solve at least one of the above problems, embodiments of the present disclosure consider improving the universal applicability of the coordination transmission technology with the aid of the network. Embodiments of the present disclosure provide a coordination method for service transmission, which can be applied to UEs from different manufacturers or UEs of different brands, and is no longer limited to a specific service, thereby improving the applicability of the inter-UE service transmission coordination technology.

Figure 2:
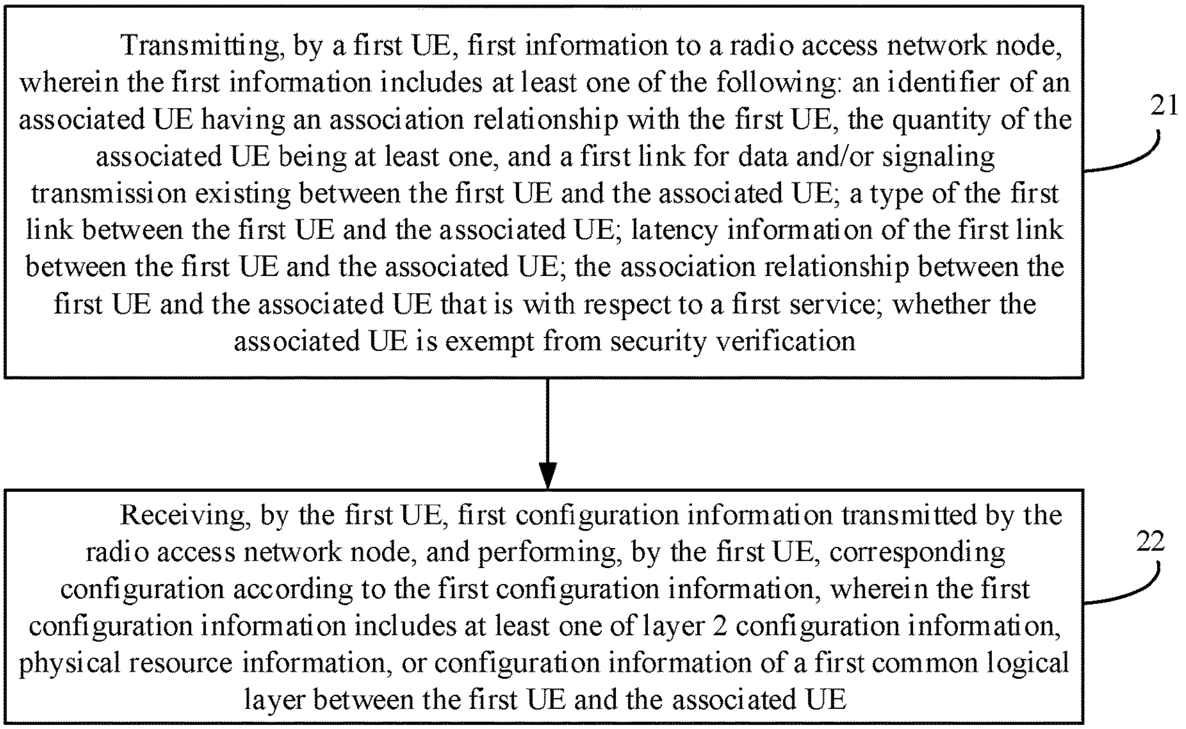
FIG. 2 is a flow chart of a coordination method for service transmission applied to a UE according to an embodiment of the present disclosure.

Referring to FIG. 2, a coordination method for service transmission provided by an embodiment of the present disclosure, when performed by a first UE, includes the following steps 21 and 22.

Step 21, transmitting, by the first UE, first information to a radio access network node, where the first information includes at least one of the following item a) to item e).

a) An identifier of an associated UE having an association relationship with the first UE, where a quantity of the associated UE is at least one, and a first link for data and/or signaling transmission exists between the first UE and the associated UE.

The associated UE does not include the first UE. The first link for data and/or signaling transmission exists between the first UE and the associated UE; the identifier of the associated UE may specifically be an international mobile equipment identity (IMEI), and the like.

b) A type of the first link between the first UE and the associated UE, such as PC5 link (a sidelink), Uu link or another link based on a non-5G interface, for example, wireless fidelity (WIFI), Bluetooth, etc.

c) Latency information of the first link between the first UE and the associated UE, where the latency information may include a latency value or a latency level for indicating the magnitude of the latency.

d) An association relationship between the first UE and the associated UE that is with respect to the first service, the association relationship between the first UE and the associated UE that is with respect to the first service includes at least one of the following: aggregation-based transmitting, abnormal handover between UEs, normal handover between UEs.

In the aggregation-based transmitting, the first UE and the associated UE transmit the same at least one service simultaneously; or transmit the same at least one service in different times; or, some UEs assist other UEs to transmit a service in a relay manner; or UEs transmit, in coordination, services that are different, but have a certain association relationship according to the association relationship between the services, such as at least one relationship among time sequence, bandwidth size, frequency domain position.

e) Whether the associated UE is exempt from security verification.

Whether security verification is exempted includes operation of at least one function among security encryption protection, integrity protection, and authentication. For example, some associated UEs are all located inside a factory computer room having strict security protection, so security verification may be omitted. However, some associated UEs are distributed in the external environment, so security verification is required.

Step 22, receiving, by the first UE, first configuration information transmitted by the radio access network node, and performing, by the first UE, corresponding configuration according to the first configuration information, where the first configuration information includes at least one of layer 2 configuration information, physical resource information, or configuration information of a first common logical layer between the first UE and the associated UE.

The layer 2 configuration information includes at least one of the following information: service data adaptation protocol (SDAP) configuration information, new logical layer configuration information, packet data convergence protocol (PDCP) configuration information, radio link control (RLC) configuration information, media access control (MAC) configuration information, physical layer configuration information.

The performing the corresponding configuration includes: according to the first configuration information, configuring at least one of the following: layer 2 of the first UE, physical resources of the first UE, the first common logical layer between the first UE and the associated UE.

Through the above steps, in the embodiment of the present disclosure, a first UE reports first information related to an associated UE, and performs corresponding configuration between the associated UEs with the aid of a radio access network node, which can provide support for service coordination between UEs from different manufacturers/of different brands/having different operating systems, thereby improving the applicability of inter-UE service transmission coordination technology.

In an embodiment of the present disclosure, the aggregation-based transmitting is to transmit data of the first service, or data of multiple services, to the radio access network node through the associated UE (which may be one or more UEs among the associated UEs) having the association relationship in case that a preset first condition is satisfied. The first condition includes at least one of the following: uplink data volume of the first service is greater than a first threshold; a signal quality of at least one UE is worse than a second threshold; a transmitting power of at least one UE is lower than a third threshold; a packet error rate of the first service is greater than a fourth threshold. The at least one UE refers to a UE that is transmitting and/or receiving data of the first service.

The abnormal handover is to change a UE currently executing the first service from a source UE to a target UE, to transmit and receive the data of the first service through the target UE, in case that a preset second condition is satisfied. The second condition includes at least one of the following: the target UE has not received a heartbeat packet from the source UE; the target UE has received a notification message that the source UE is abnormal from the source UE; the target UE has received a notification message that the source UE is abnormal from a network; a higher layer of the target UE has determined that the source UE is abnormal.

The normal handover is to change the UE currently executing the first service from the source UE to the target UE, to transmit and receive the data of the first service through the target UE, in case that a preset third condition is satisfied. The third condition includes at least one of the following: a higher layer (for example, the application layer) of the target UE instructs the radio access layer of the target UE to change the UE executing the first service; a transmitting power of the source UE is lower than a fifth threshold; the transmitting power of the source UE is lower than a sixth threshold.

Here, the source UE and the target UE are two different UEs among the associated UEs, the first UE may be the source UE, or the first UE is the target UE, or the first UE is another UE different than the source UE and the target UE.

For example, it is assumed that the associated UE further includes a second UE, in case that the association relationship between the first UE and the second UE that is with respect to the first service includes the abnormal handover between UEs, the method according to the embodiment of the present disclosure may further include: configuring an abnormal handover scheme between the first UE and the second UE. Specifically, the configuration may be performed by a radio access network node, or by a UE.

For example, when the radio access network node performs the configuration, the radio access network node may determine an abnormal handover scheme between the associated UEs based on latency information of the first link between the associated UEs and quality of service requirement of the first service (such as at least one requirement of latency, reliability, jitter, bandwidth, etc.), and then may transmit second configuration information to the UE. The first UE may receive the second configuration information transmitted by the radio access network node, and may configure an abnormal handover scheme between the first UE and the second UE according to the second configuration information, where the second configuration information includes configuration of an abnormal handover scheme between the first UE and the second UE.

For another example, when a UE performs configuration, the first UE may determine an abnormal handover scheme between the first UE and the second UE for the first service based on latency information of the first link between the first UE and the second UE and first quality of service requirement (such as latency and reliability) of the first service, and may transmit indication information of the determined abnormal handover scheme to the radio access network node.

More specifically, embodiments of the present disclosure provide various abnormal handover schemes. For example, the abnormal handover schemes include a first abnormal handover scheme and a second abnormal handover scheme. Here, the first abnormal handover scheme is generally applied to scenarios where a UE among associated UEs can quickly detect an abnormal state of another UE among the associated UEs, and the second abnormal handover scheme is generally applied to scenarios where a UE among associated UEs cannot quickly detect an abnormal state of another UE among the associated UEs. One way of detecting abnormality among associated UEs may be based on transmitting and receiving of heartbeat packets. For example, when one UE fails to receive one or more heartbeat packets transmitted by another UE, the one UE may determine that abnormality occurs to the another UE. Whether the abnormal state of other UE can be quickly detected usually depends on factors such as a transmission latency of a link between the UEs and a transmitting frequency of the heartbeat packets.

In the first abnormal handover scheme, processing manners in uplink and downlink directions are as follows:

in the downlink direction, transmitting, through a second common logical layer on a side of the radio access network node, downlink data of the first service to the UE currently executing the first service, and in response to abnormality occurring to the UE currently executing the first service, changing the UE currently executing the first service from the source UE to the target UE, and through the second common logical layer, performing at least one of following functional processing: serial number alignment, redundancy check, data ordering, data sequential transmission and/or sequential delivery and the like on the downlink data, and transmitting the downlink data to the target UE; and in the uplink direction, transmitting, by the UE currently executing the first service, uplink data of the first service to the radio access network node, and in response to abnormality occurring to the UE currently executing the first service, changing the UE currently executing the first service from the source UE to the target UE, and transmitting, by the target UE, the uplink data to the radio access network node, wherein the source UE and the target UE perform at least one of the functional processing: serial number alignment, redundancy check, data ordering, data sequential transmission and/or sequential delivery and the like on the uplink data through the first common logical layer;

wherein the source UE is one of the first UE and the second UE, and the target UE is the other UE of the first UE and the second UE.

As mentioned above, the first abnormal handover scheme is generally applied to scenarios where a UE among associated UEs can quickly detect an abnormal state of another UE among the associated UEs. In the scenarios, since the abnormality can be detected quickly among associated UEs, change in the transmission of uplink and downlink data may be performed after the inter-UE handover is completed.

In the second abnormal handover scheme, processing manners in uplink and downlink directions are as follows:

in the downlink direction, transmitting, through the second common logical layer on a side of the radio access network node, downlink data of the first service to the first UE and the second UE, and in response to abnormality occurring to the source UE, changing the UE currently executing the first service from the source UE to the target UE, and performing, through the second common logical layer, at least one of following functional processing: serial number alignment, redundancy check, data ordering, data sequential transmission and/or sequential delivery and the like on the downlink data, wherein the downlink data of the first service is transmitted through the second common logical layer on the side of the radio access network node to the first common logical layer between the first UE and the second UE, and only the UE currently executing the first service parses the downlink data received by the first common logical layer; and in the uplink direction, transmitting, by the UE currently executing the first service, uplink data of the first service to the first common logical layer, transmitting, through the first common logical layer, the uplink data to the associated UE having the association relationship, and, in response to abnormality occurring to the UE currently executing the first service, changing the UE currently executing the first service from the source UE to the target UE, wherein only the UE currently executing the first service transmits the uplink data to the radio access network node.

Here, the source UE is one of the first UE and the second UE, and the target UE is the other UE of the first UE and the second UE.

As mentioned above, the second abnormal handover scheme is generally applied to scenarios where a UE among associated UEs cannot quickly detect an abnormal state of another UE among the associated UEs. In the second abnormal handover scheme, in the downlink direction (DL), multiple copies of information data of the first service are transmitted to involved UEs (e.g., UE1 and UE2), and a second common logical layer is utilized to ensure the consistency of serial numbers (SNs) of data of various UEs to avoid data confusion. The multiple copies of the information data of the first service may be transmitted to the involved UEs (e.g., UE1 and UE2) by using separate radio resources, i.e., the multiple copies of the information data of the first service are transmitted separately to the involved UEs (e.g., UE1 and UE2); alternatively, the downlink data of the first service may be transmitted to the first UE and the second UE by using one PDSCH scrambled by a radio network temporary identity (RNTI) shared by the first UE and the second UE. In the uplink direction (UL), since there is a connection between two UEs, multiple copies of data are transmitted to each of the associated UEs and allocated SNs are aligned among the UEs through the first common logical layer. The first common logical layer may be located at the application layer or the L2 layer, such as PDCP. In normal circumstances, although data has been transmitted to all UEs, only one of the UEs decodes/encodes and processes data in DL/UL. Only in the case that a failure occurs to the UE currently executing the service, an associated UE is activated to take over the execution of the first service in the abnormal state, that is, the associated UE becomes a new UE currently executing the service, to start decoding/encoding and processing data in DL/UL. Since abnormality cannot be quickly detected among UEs, embodiments of the present disclosure introduce a common logical layer to cache uplink and downlink data of the first service, which can reduce problems such as packet loss caused by a failure to timely perform inter-UE handover when an abnormality occurs.

In this specification, the changing the UE currently executing the first service from the source UE to the target UE may also be described as: migrating the UE currently executing the first service from the source UE to the target UE. After the change or migration is completed, the network transmits the downlink data of the first service to the target UE, and the target UE receives and processes the downlink data of the first service, and may also transmit uplink data of the first service to the network.

In addition, the first abnormal handover scheme includes: in the downlink direction, after the change occurs, the source UE of the first service further transmits the downlink data of the first service to the target UE through the first common logical layer. The first abnormal handover scheme includes: in the downlink direction, after the change occurs, the source UE of the first service further transmits the downlink data of the first service to the target UE through the first common logical layer. Through the above processing, the success rate of data reception can be improved, and data packets that need to be retransmitted after the change can be reduced.

In the above method according to the embodiments of the present disclosure, the radio access network node may determine a UE currently executing the first service (which may also be referred to as main terminal) from associated UEs of the first service, and then may establish a public tunnel and a separate air interface radio bearer for the first service between various UEs; wherein the UE currently executing the first service has complete access stratum (AS) protocol stack, while the other UEs generally only have a part of the AS protocol stack (such as a protocol stack from the RLC layer to the physical layer). A radio resource control (RRC) connection exists between the UE currently executing the first service and the radio access network node. The radio access network node may determine whether an RRC connection has been established between the radio access network node and other UEs, and if there is no RRC connection, the UE currently executing the first service transmits related configuration information and a scheduling identifier to other UEs. In this way, the access network only knows an association relationship between identifiers (e.g., cell radio network temporary identity (C-RNTI)) of the UE currently executing the first service and other UEs. That is, the core network only knows one UE (e.g., anchor UE), without knowing any other UEs, and the radio access network node only triggers the establishment of a PDU session and a non-access stratum (NAS) bearer between the UE currently executing the first service and the core network.

In this way, prior to the step 21, the first UE may further receive third configuration information transmitted by the radio access network node, the third configuration information is used for configuring and establishing a public tunnel and an air interface radio bearer for the first service. Then, according to the third configuration information, the first UE establishes the public tunnel between the first UE and the core network and the air interface radio bearer between the first UE and the radio access network node for the first service.

Specifically, when the first UE is the UE currently executing the first service, the first UE establishes an RRC connection with the radio access network node, and receives the third configuration information transmitted by the network node via the RRC connection.

In case that the first UE has an association relationship with the UE currently executing the first service, and has not established an RRC connection between the first UE and the radio access network node, the first UE receives the third configuration information and a scheduling identifier transmitted by the UE currently executing the first service. The scheduling identifier may specifically be a C-RNTI.

In practical applications, in a process of execution of the first service, an associated UE may be newly added, such as a third UE. In this case, information of the associated UE may be further updated in an embodiment of the present disclosure. Specifically, the first UE may transmit second information to the radio access network node, wherein the second information includes at least one of the following:

an identifier of the third UE, wherein the third UE is a UE that is newly added during execution of the first service and has an association relationship with the first UE;

a type of the first link between the first UE and the third UE;

latency information of the first link between the first UE and the third UE;

an association relationship between the first UE and the third UE that is with respect to the first service;

whether the third UE is exempt from security verification.

The first UE receives fourth configuration information transmitted by the radio access network node, and updates corresponding configuration according to the fourth configuration information, wherein the fourth configuration information includes at least one of layer 2 configuration update information, physical resource update information, or configuration update information of the first common logical layer between the first UE and the associated UE.

A PDCP window and/or an RLC window of the third UE is initialized based on a serial number of a first data packet received by the third UE, or is initialized based on a hyper frame number (HFN) and/or serial number (SN) transmitted by the radio access network node. The initializing based on the serial number of the first data packet received by the third UE includes: taking the serial number of the received first data packet as an initial value of a reception window, or taking the result of subtracting a half of a length of the reception window from the serial number of the received first data packet as an initial value of the reception window.

In an embodiment of the present disclosure, in case that the first information indicates that the second UE is exempt from security verification, the first UE may transmit, to the second UE, a security key, an integrity key, and algorithm information allocated to the first UE by a core network and the radio access network node, to enable the second UE to perform data encryption by using the security key, the integrity key, and the algorithm information of the first UE.

In case that the first information does not indicate that the second UE is exempt from security verification, the following may be implemented:

1) third information and fourth information of the second UE are allocated to the second UE by a core network and the radio access network node respectively;

2) third information allocated by a core network is shared by the second UE and the first UE, and fourth information of the second UE is allocated by the radio access network node to the second UE;

wherein the third information includes at least one of a NAS security key, a NAS integrity key, or NAS algorithm information; the fourth information includes at least one of an AS security key, an AS integrity key, or AS algorithm information.

In the case where the first information does not indicate that the second UE is exempt from security verification, if the association relationship between the first UE and the second UE is the aggregation-based transmitting, uplink data of the first service that is transmitted by the first UE is encrypted through the fourth information of the first UE, then transmitted to the second UE, further encrypted through the fourth information of the second UE, and finally transmitted to a side of the radio access network node. Correspondingly, after receiving the uplink data transmitted by the second UE, the radio access network node first uses the fourth information of the second UE to perform decryption, and then uses the fourth information of the first UE to perform decryption, so as to obtain the decrypted uplink data.

Figure 3:
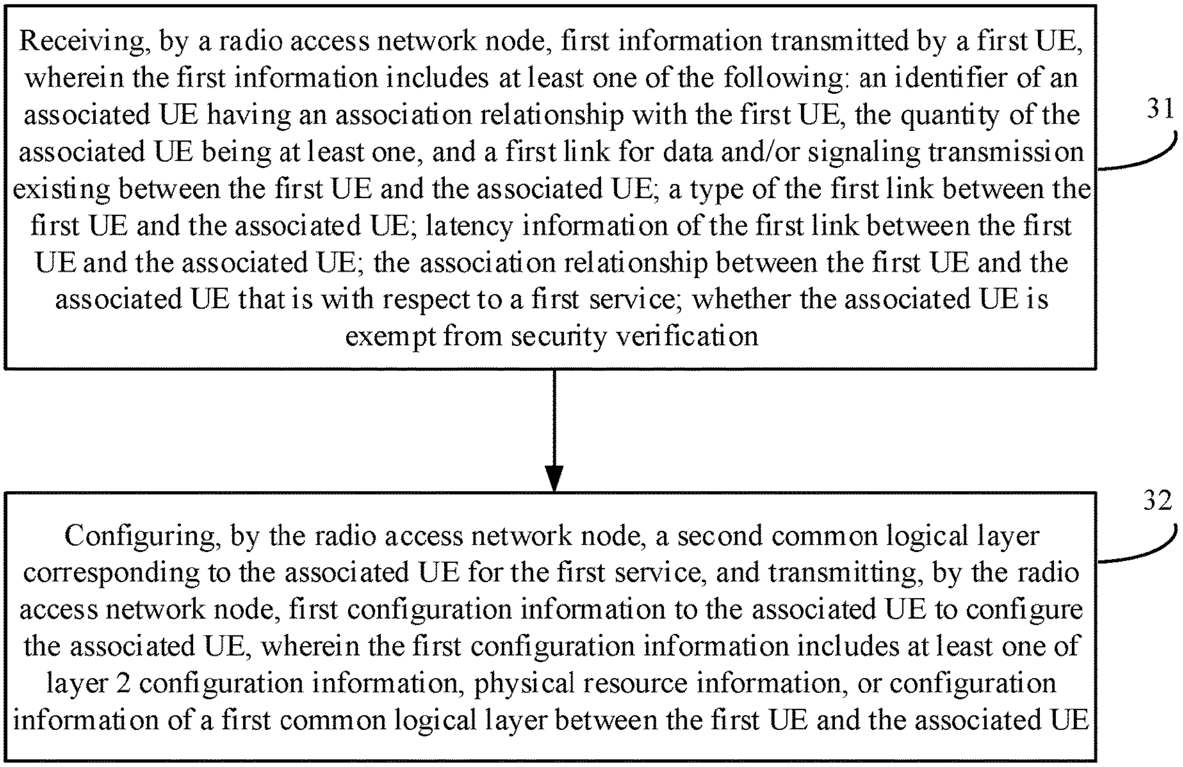
FIG. 3 is a flow chart of a coordination method for service transmission applied to a radio access network node according to an embodiment of the present disclosure.

Referring to FIG. 3, a coordination method for service transmission provided by an embodiment of the present disclosure, when performed at a side of a radio access network node, includes the following steps 31 and 32.

Step 31: receiving, by the radio access network node, first information transmitted by a first UE, wherein the first information includes at least one of the following:

an identifier of an associated UE having an association relationship with the first UE, wherein a quantity of the associated UE is at least one, and a first link for data and/or signaling transmission exists between the first UE and the associated UE;

a type of the first link between the first UE and the associated UE;

latency information of the first link between the first UE and the associated UE;

the association relationship between the first UE and the associated UE that is with respect to a first service;

whether the associated UE is exempt from security verification.

Step 32: configuring, by the radio access network node, a second common logical layer corresponding to the associated UE for the first service, and transmitting, by the radio access network node, first configuration information to the first UE and the associated UE, to configure the associated UE, wherein the first configuration information includes at least one of layer 2 configuration information, physical resource information, or configuration information of a first common logical layer between the first UE and the associated UE.

Optionally, before the configuring, by the radio access network node, the second common logical layer corresponding to the associated UE for the first service, and transmitting, by the radio access network node, the first configuration information to the first UE and the associated UE, to configure the associated UE, the radio access network node determines a location of the second common logical layer of the associated UE according to the received first information transmitted by the first UE.

For example, if a transmission latency of the first link is lower than a preset first threshold, the MAC layer may be used as the second common logical layer; and if the transmission latency of the first link is higher than a preset second threshold, the PDCP or RLC layer may be used as the second common logical layer.

If the association relationship is the aggregation-based transmitting, any layer of PDCP, RLC, MAC and physical layer may be used as the second common logical layer; if the association relationship is an abnormal lossy handover, MAC or the physical layer may be used as the second common logical layer; and if the association relationship is an abnormal lossless handover, SDAP or PDCP may be used as the second common logical layer.

In the embodiments of the present disclosure, through the above steps, a radio access network node performs corresponding configurations between associated UEs, which can provide support for service coordination between UEs from different manufacturers/of different brands, further expand application scenarios of inter-UE service coordination technology, so as to improve its applicability.

Specifically, the association relationship of the associated UEs that is with respect to the first service includes at least one of the following: aggregation-based transmitting, abnormal handover between UEs, normal handover between UEs.

For details of the aggregation-based transmitting, the abnormal handover between UEs, or the normal handover between UEs, reference can be made to the above description, which will not be repeated here for concision.

In an embodiment of the present disclosure, the associated UE further includes a second UE, and in case that the association relationship between the first UE and the second UE that is with respect to the first service includes the abnormal handover between UEs, the radio access network node may determine an abnormal handover scheme between the first UE and the second UE for the first service in the following manners:

1) determining, by the radio access network node, an abnormal handover scheme between the first UE and the second UE for the first service according to the latency information of the first link between the first UE and the second UE and a first quality of service requirement of the first service, and transmitting, by the radio access network node, second configuration information to the first UE to configure the abnormal handover scheme between the first UE and the second UE, wherein the second configuration information includes configuration of the abnormal handover scheme between the first UE and the second UE;
2) receiving, by the radio access network node, first indication information transmitted by the first UE, wherein the first indication information is used for indicating an abnormal handover scheme between the first UE and the second UE for the first service.

Specifically, the abnormal handover scheme includes first and second abnormal handover schemes.

The first abnormal handover scheme includes:

in a downlink direction, transmitting, through the second common logical layer on a side of the radio access network node, downlink data of the first service to a UE currently executing the first service, and in response to abnormality occurring to the UE currently executing the first service, changing the UE currently executing the first service from the source UE to the target UE, and through the second common logical layer, performing at least one of functional processing: serial number alignment, redundancy check, data ordering, data sequential transmission and/or sequential delivery and the like on the downlink data, and transmitting the downlink data to the target UE; and in an uplink direction, transmitting, by the UE currently executing the first service, uplink data of the first service to the radio access network node, and in response to abnormality occurring to the UE currently executing the first service, changing the UE currently executing the first service from the source UE to the target UE, and transmitting, by the target UE, the uplink data to the radio access network node, wherein the source UE and the target UE perform at least one of the following functional processing: serial number alignment, redundancy check, data ordering, data sequential transmission and/or sequential delivery and the like on the uplink data through the first common logical layer.

The second abnormal handover scheme includes:

in a downlink direction, transmitting, through the second common logical layer on the side of the radio access network node, downlink data of the first service to the first UE and the second UE, and in response to abnormality occurring to the source UE, changing the UE currently executing the first service from the source UE to the target UE, and through the second common logical layer, performing at least one of the following functional processing: serial number alignment, redundancy check, data ordering, data sequential transmission and/or sequential delivery and the like on the downlink data, wherein only the UE currently executing the first service parses the downlink data received by the first common logical layer; and in an uplink direction, transmitting, by the UE currently executing the first service, uplink data of the first service to the first common logical layer, transmitting, through the first common logical layer, the uplink data to the associated UE having the association relationship, and, in response to abnormality occurring to the UE currently executing the first service, changing the UE currently executing the first service from the source UE to the target UE, wherein only the UE currently executing the first service transmits the uplink data to the radio access network node.

Here, the source UE is one of the first UE and the second UE, and the target UE is the other UE of the first UE and the second UE.

In the second abnormal handover scheme, in the downlink direction, the transmitting, through the second common logical layer on the side of the radio access network node, the downlink data of the first service to the first UE and the second UE may specifically include: transmitting, by the second common logical layer on the side of the radio access network node, the downlink data of the first service to the first UE and the second UE by using one PDSCH transmission scrambled by an RNTI shared by the first UE and the second UE.

In addition, in the first abnormal handover scheme and/or the second abnormal handover scheme, in the downlink direction, after the change occurs, the source UE of the first service further transmits the downlink data of the first service to the target UE through the first common logical layer. In this case, the first link between the source UE and the target UE is normal, and the downlink data may be transmitted between the UEs.

In an embodiment of the present disclosure, prior to the step 31, the radio access network node may further transmit third configuration information to the first UE, the third configuration information is used for configuring and establishing a public tunnel and an air interface radio bearer for the first service, so that the first UE establishes a public tunnel between the first UE and the core network for the first service, and establishes an air interface radio bearer between the first UE and a radio access network node.

Specifically, when the first UE is a UE currently executing the first service, the radio access network node establishes an RRC connection with the first UE, and transmits the third configuration information to the first UE via the RRC connection. In case that the first UE has an association relationship with the UE currently executing the first service, and has not established RRC connection with the radio access network node, the radio access network node transmits the third configuration information and a scheduling identifier to the first UE through the UE currently executing the first service.

During execution of the first service, if a new UE (such as a third UE) is added into the associated UEs, the radio access network node may further receive second information transmitted by the first UE. The second information includes at least one of the following:

an identifier of the third UE, where the third UE is a UE that is newly added during execution of the first service and has an association relationship with the first UE;

a type of the first link between the first UE and the third UE;

latency information of the first link between the first UE and the third UE;

an association relationship between the first UE and the third UE that is with respect to the first service;

whether the third UE is exempt from security verification.

The radio access network node updates configuration of the second common logical layer for the first service, and transmits fourth configuration information to the first UE and the associated UE, wherein the fourth configuration information includes at least one of layer 2 configuration update information, physical resource update information, or configuration update information of the first common logical layer between the first UE and the associated UE.

A PDCP window and/or an RLC window of the third UE is initialized based on a serial number of a first data packet received by the third UE, or is initialized based on an HFN and/or an SN transmitted by the radio access network node. The initializing based on the serial number of the first data packet received by the third UE includes: taking the serial number of the received first data packet as an initial value of a reception window, or taking the result of subtracting a half of a length of the reception window from the serial number of the received first data packet as an initial value of the reception window.

In an embodiment of the present disclosure, in case that the first information in the step 31 indicates that the second UE is exempt from security verification, the radio access network node may also cancel a procedure of triggering establishment of a connection between the second UE and a core network and authentication of the second UE, wherein a security key, an integrity key and algorithm information used by the second UE are the same as a security key, an integrity key and algorithm information allocated by the core network and the radio access network node to the first UE.

In an embodiment of the present disclosure, in case that the first information in the above step 31 does not indicate that the second UE is exempt from security verification, third information and fourth information of the second UE are allocated to the second UE by a core network and the radio access network node respectively; or, third information allocated by a core network is shared by the second UE and the first UE, and fourth information of the second UE is allocated by the radio access network node to the second UE. Here, the third information includes at least one of a NAS security key, a NAS integrity key, or NAS algorithm information; the fourth information includes at least one of an AS security key, an AS integrity key, or AS algorithm information. In this case, if the association relationship between the first UE and the second UE is the aggregation-based transmitting, the uplink data received by the radio access network node from the second UE is first decrypted through the fourth information of the second UE, and then is further decrypted through the fourth information of the first UE, to obtain decrypted uplink data.

Various methods of the embodiments of the present disclosure have been introduced above. A device for implementing the above method will be further provided below.

Figure 4:
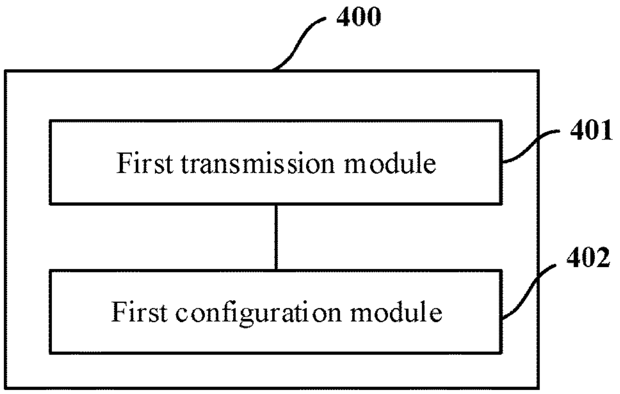
FIG. 4 is a schematic structural diagram of a UE according to an embodiment of the present disclosure.

Referring to FIG. 4, an embodiment of the present disclosure further provides a user equipment 400, which includes:

a first transmission module 401, configured to transmit first information to a radio access network node, wherein the first information includes at least one of the following:

an identifier of an associated UE having an association relationship with the first UE, where a quantity of the associated UE is at least one, and a first link for data and/or signaling transmission exists between the first UE and the associated UE;

a type of the first link between the first UE and the associated UE;

latency information of the first link between the first UE and the associated UE;

the association relationship between the first UE and the associated UE that is with respect to a first service;

whether the associated UE is exempt from security verification; and a first configuration module 402, configured to receive first configuration information transmitted by the radio access network node, and perform corresponding configuration according to the first configuration information, where the first configuration information includes at least one of layer 2 configuration information, physical resource information, or configuration information of a first common logical layer between the first UE and the associated UE.

Optionally, the association relationship between the first UE and the associated UE that is with respect to the first service includes at least one of the following: aggregation-based transmitting, abnormal handover between UEs, normal handover between UEs.

Optionally, the aggregation-based transmitting is to transmit data of the first service to the radio access network node through the associated UE having the association relationship in case that a preset first condition is satisfied, where the first condition includes at least one of the following: uplink data volume of the first service is greater than a first threshold; a signal quality of at least one UE is worse than a second threshold; a transmitting power of at least one UE is lower than a third threshold; a packet error rate of the first service is greater than a fourth threshold;

the abnormal handover is to change a UE currently executing the first service from a source UE to a target UE, to transmit and receive the data of the first service through the target UE, in case that a preset second condition is satisfied; where the second condition includes at least one of the following: the target UE has not received a heartbeat packet from the source UE; the target UE has received a notification message that the source UE is abnormal from the source UE; the target UE has received a notification message that the source UE is abnormal from a network; a higher layer of the target UE has determined that the source UE is abnormal;

the normal handover is to change the UE currently executing the first service from the source UE to the target UE, to transmit and receive the data of the first service through the target UE, in case that a preset third condition is satisfied, where the third condition includes at least one of the following: a higher layer of the target UE instructs that the UE executing the first service is to be changed; a transmitting power of the source UE is lower than a fifth threshold; the transmitting power of the source UE is lower than a sixth threshold;

where the source UE and the target UE are two different UEs in the associated UEs, the first UE is the source UE, or the target UE, or another UE different from the source UE and the target UE.

Optionally, the associated UE further includes a second UE, the UE further includes:

a second configuration module, configured to: in case that the association relationship between the first UE and the second UE that is with respect to the first service includes the abnormal handover between UEs, receive second configuration information transmitted by the radio access network node, and configure an abnormal handover scheme between the first UE and the second UE according to the second configuration information, where the second configuration information includes configuration of the abnormal handover scheme between the first UE and the second UE; or, a second transmission module, configured to determine an abnormal handover scheme between the first UE and the second UE for the first service according to latency information of the first link between the first UE and the second UE and a first quality of service requirement of the first service, and transmit indication information of the determined abnormal handover scheme to the radio access network node.

Optionally, the abnormal handover scheme includes a first abnormal handover scheme and a second abnormal handover scheme;

the first abnormal handover scheme includes:

in the downlink direction, transmitting, through the second common logical layer on a side of the radio access network node, downlink data of the first service to the UE currently executing the first service, and in response to abnormality occurring to the UE currently executing the first service, changing the UE currently executing the first service from the source UE to the target UE, and through the second common logical layer, performing at least one of following functional processing: serial number alignment, redundancy check, data ordering, data sequential transmission and/or sequential delivery and the like on the downlink data, and transmitting the downlink data to the target UE; and in the uplink direction, transmitting, by the UE currently executing the first service, uplink data of the first service to the radio access network node, and in response to abnormality occurring to the UE currently executing the first service, changing the UE currently executing the first service from the source UE to the target UE, and transmitting, by the target UE, the uplink data to the radio access network node, where the source UE and the target UE perform at least one of the following functional processing: serial number alignment, redundancy check, data ordering, data sequential transmission and/or sequential delivery and the like on the uplink data through the first common logical layer, where the source UE is one of the first UE and the second UE, and the target UE is another UE of the first UE and the second UE;

the second abnormal handover scheme includes:

in the downlink direction, transmitting, through the second common logical layer on a side of the radio access network node, downlink data of the first service to the first UE and the second UE, and in response to abnormality occurring to the source UE, changing the UE currently executing the first service from the source UE to the target UE, and through the second common logical layer, performing at least one of the following functional processing: serial number alignment, redundancy check, data ordering, data sequential transmission and/or sequential delivery and the like on the downlink data, wherein only the UE currently executing the first service parses the downlink data received by the first common logical layer; and in the uplink direction, transmitting, by the UE currently executing the first service, uplink data of the first service to the first common logical layer, transmitting, through the first common logical layer, the uplink data to the associated UE having the association relationship, and, in response to abnormality occurring to the UE currently executing the first service, changing the UE currently executing the first service from the source UE to the target UE, where only the UE currently executing the first service transmits the uplink data to the radio access network node.

Optionally, the first abnormal handover scheme and/or the second abnormal handover scheme further includes: in the downlink direction, after the change of the UE currently executing the first service, transmitting, by the source UE of the first service, the downlink data of the first service to the target UE through the first common logical layer.

Optionally, the UE further includes:

a first reception module, configured to, before transmitting the first information to the radio access network node, receive third configuration information transmitted by the radio access network node, where the third configuration information is used for configuring and establishing a public tunnel and an air interface radio bearer for the first service; and a third configuration module, configured to establish the public tunnel between the first UE and a core network and the air interface radio bearer between the first UE and the radio access network node for the first service according to the third configuration information.

Optionally, the first reception module is further configured to:

in case that the first UE is the UE currently executing the first service, establish an RRC connection with the radio access network node, and receive, via the RRC connection, the third configuration information transmitted by the radio access network node; and in case that the first UE has an association relationship with the UE currently executing the first service, and no RRC connection is established between the first UE and the radio access network node, receive the third configuration information and a scheduling identifier transmitted by the UE currently executing the first service.

Optionally, the UE further includes:

a third transmission module, configured to transmit second information to the radio access network node, where the second information includes at least one of the following:

an identifier of a third UE, where the third UE is a UE that is newly added during execution of the first service and has an association relationship with the first UE;

a type of the first link between the first UE and the third UE;

latency information of the first link between the first UE and the third UE;

an association relationship between the first UE and the third UE that is with respect to the first service;

whether the third UE is exempt from security verification; and a fourth configuration module, configured to receive fourth configuration information transmitted by the radio access network node, and update corresponding configuration according to the fourth configuration information, where the fourth configuration information includes at least one of layer 2 configuration update information, physical resource update information, or configuration update information of the first common logical layer between the first UE and the associated UE, where a PDCP window and/or an RLC window of the third UE is initialized based on a serial number of a first data packet received by the third UE, or is initialized based on an HFN and/or an SN transmitted by the radio access network node.

Optionally, the UE further includes a fourth transmission module, configured to: in case that the first information indicates that the second UE is exempt from security verification, transmit to the second UE a security key, an integrity key, and algorithm information allocated to the first UE by a core network and the radio access network node, to enable the second UE to perform data encryption by using the security key, the integrity key, and the algorithm information of the first UE.

Optionally, in case that the first information does not indicate that the second UE is exempt from security verification, third information and fourth information of the second UE are allocated to the second UE by a core network and the radio access network node respectively; or, third information allocated by a core network is shared by the second UE and the first UE, and fourth information of the second UE is allocated by the radio access network node to the second UE; where the third information includes at least one of a NAS security key, a NAS integrity key, or NAS algorithm information; the fourth information includes at least one of an AS security key, an AS integrity key, or AS algorithm information.

Optionally, the UE further includes: a fifth transmission module, configured to transmit uplink data of the first service, in case that the association relationship between the first UE and the second UE is the aggregation-based transmitting, where the uplink data is encrypted through the fourth information of the first UE, then transmitted to the second UE, further encrypted through the fourth information of the second UE, and finally transmitted to a side of the radio access network node.

It should be noted that the device in these embodiments corresponds to the above method shown in FIG. 2, all the implementations in the above embodiments are applicable to the embodiments of the device, and the same technical effect can also be achieved. The above device provided by the embodiments of the present disclosure can implement all the method steps implemented in the above method embodiments, and can achieve the same technical effect. Therefore, the description and the beneficial effect of the embodiments that are the same as the method embodiments will not be repeated here in detail.

Figure 5:
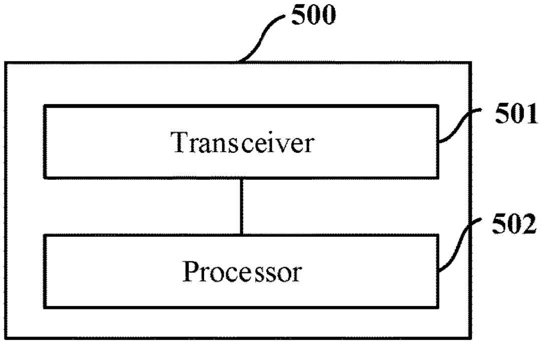
FIG. 5 is a schematic structural diagram of a UE according to another embodiment of the present disclosure.

Referring to FIG. 5, an embodiment of the present disclosure further provides a user equipment 500, including: a transceiver 501 and a processor 502.

The transceiver 501 is configured to transmit first information to a radio access network node, where the first information includes at least one of the following:

an identifier of an associated UE having an association relationship with the first UE, where a quantity of the associated UE is at least one, and a first link for data and/or signaling transmission exists between the first UE and the associated UE;

a type of the first link between the first UE and the associated UE;

latency information of the first link between the first UE and the associated UE;

the association relationship between the first UE and the associated UE that is with respect to a first service;

whether the associated UE is exempt from security verification.

The processor 502 is configured to receive first configuration information transmitted by the radio access network node, and perform corresponding configuration according to the first configuration information, where the first configuration information includes at least one of layer 2 configuration information, physical resource information, or configuration information of a first common logical layer between the first UE and the associated UE.

Optionally, the associated UE further includes a second UE, and the processor is further configured to:

in case that the association relationship between the first UE and the second UE that is with respect to the first service includes the abnormal handover between UEs, receive second configuration information transmitted by the radio access network node, and configure an abnormal handover scheme between the first UE and the second UE according to the second configuration information, where the second configuration information includes configuration of the abnormal handover scheme between the first UE and the second UE; or, determine an abnormal handover scheme between the first UE and the second UE for the first service according to latency information of the first link between the first UE and the second UE, and a first quality of service requirement of the first service, and transmit indication information of the determined abnormal handover scheme to the radio access network node.

Optionally, the abnormal handover scheme includes a first abnormal handover scheme and a second abnormal handover scheme;

the first abnormal handover scheme includes:

in the downlink direction, transmitting, through the second common logical layer on a side of the radio access network node, downlink data of the first service to the UE currently executing the first service, and in response to abnormality occurring to the UE currently executing the first service, changing the UE currently executing the first service from the source UE to the target UE, and through the second common logical layer, performing at least one of the following functional processing: serial number alignment, redundancy check, data ordering, data sequential transmission and/or sequential delivery and the like on the downlink data, and transmitting the downlink data to the target UE; and in the uplink direction, transmitting, by the UE currently executing the first service, uplink data of the first service to the radio access network node, and in response to abnormality occurring to the UE currently executing the first service, changing the UE currently executing the first service from the source UE to the target UE, and transmitting, by the target UE, the uplink data to the radio access network node, where the source UE and the target UE perform at least one of the following functional processing: serial number alignment, redundancy check, data ordering, data sequential transmission and/or sequential delivery and the like on the uplink data through the first common logical layer, where the source UE is one of the first UE and the second UE, and the target UE is another UE of the first UE and the second UE;

the second abnormal handover scheme includes:

in the downlink direction, transmitting, through the second common logical layer on a side of the radio access network node, downlink data of the first service to the first UE and the second UE, and in response to abnormality occurring to the source UE, changing the UE currently executing the first service from the source UE to the target UE, and through the second common logical layer, performing at least one of the following functional processing: serial number alignment, redundancy check, data ordering, data sequential transmission and/or sequential delivery and the like on the downlink data, where only the UE currently executing the first service parses the downlink data received by the first common logical layer; and in the uplink direction, transmitting, by the UE currently executing the first service, uplink data of the first service to the first common logical layer, transmitting, through the first common logical layer, the uplink data to the associated UE having the association relationship, and, in response to abnormality occurring to the UE currently executing the first service, changing the UE currently executing the first service from the source UE to the target UE, where only the UE currently executing the first service transmits the uplink data to the radio access network node.

Optionally, the first abnormal handover scheme and/or the second abnormal handover scheme further includes: in the downlink direction, after the change of the UE currently executing the first service, transmitting, by the source UE of the first service, the downlink data of the first service to the target UE through the first common logical layer.

Optionally, the processor is further configured to:

receive third configuration information transmitted by the radio access network node, before transmitting the first information to the radio access network node, where the third configuration information is used for configuring and establishing a public tunnel and an air interface radio bearer for the first service; and establish the public tunnel between the first UE and a core network and the air interface radio bearer between the first UE and the radio access network node for the first service according to the third configuration information.

Optionally, the processor is further configured to:

in case that the first UE is the UE currently executing the first service, establish an RRC connection with the radio access network node, and receive, via the RRC connection, the third configuration information transmitted by the radio access network node; and in case that the first UE has an association relationship with the UE currently executing the first service, and no RRC connection is established between the first UE and the radio access network node, receive the third configuration information and a scheduling identifier transmitted by the UE currently executing the first service.

Optionally, the processor is further configured to: transmit second information to the radio access network node, where the second information includes at least one of the following:

an identifier of a third UE, where the third UE is a UE that is newly added during execution of the first service and has an association relationship with the first UE;

a type of the first link between the first UE and the third UE;

latency information of the first link between the first UE and the third UE;

an association relationship between the first UE and the third UE that is with respect to the first service;

whether the third UE is exempt from security verification; and receive fourth configuration information transmitted by the radio access network node, and update corresponding configuration according to the fourth configuration information, where the fourth configuration information includes at least one of layer 2 configuration update information, physical resource update information, or configuration update information of the first common logical layer between the first UE and the associated UE, where a PDCP window and/or an RLC window of the third UE is initialized based on a serial number of a first data packet received by the third UE, or is initialized based on an HFN and/or an SN transmitted by the radio access network node.

Optionally, the processor is further configured to: in case that the first information indicates that the second UE is exempt from security verification, transmit to the second UE a security key, an integrity key, and algorithm information allocated to the first UE by a core network and the radio access network node, to enable the second UE to perform data encryption by using the security key, the integrity key, and the algorithm information of the first UE.

Optionally, in case that the first information does not indicate that the second UE is exempt from security verification, third information and fourth information of the second UE are allocated to the second UE by a core network and the radio access network node respectively; or, third information allocated by a core network is shared by the second UE and the first UE, and fourth information of the second UE is allocated by the radio access network node to the second UE; where the third information includes at least one of a NAS security key, a NAS integrity key, or NAS algorithm information; the fourth information includes at least one of an AS security key, an AS integrity key, or AS algorithm information.

Optionally, the processor is further configured to: transmit uplink data of the first service, in case that the association relationship between the first UE and the second UE is the aggregation-based transmitting, where uplink data is encrypted through the fourth information of the first UE, then transmitted to the second UE, further encrypted through the fourth information of the second UE, and finally transmitted to a side of the radio access network node.

It should be noted that the device in these embodiments corresponds to the above method shown in FIG. 2, all the implementations in the above embodiments are applicable to the embodiments of the device, and the same technical effect can also be achieved. The above device provided by the embodiments of the present disclosure can implement all the method steps realized in the above method embodiments, and can achieve the same technical effect. Therefore, the description and the beneficial effect of the embodiments that are the same as the method embodiments will not be repeated here in detail.

Figure 6:
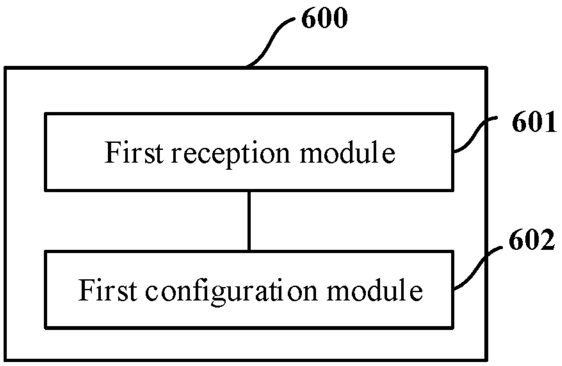
FIG. 6 is a schematic structural diagram of a network device according to an embodiment of the present disclosure.

Referring to FIG. 6, an embodiment of the present disclosure further provides a radio access network node 600, which includes:

a first reception module 601, configured to receive first information transmitted by a first UE, where the first information includes at least one of the following:

an identifier of an associated UE having an association relationship with the first UE, where a quantity of the associated UE is at least one, and a first link for data and/or signaling transmission exists between the first UE and the associated UE;

a type of the first link between the first UE and the associated UE;

latency information of the first link between the first UE and the associated UE;

the association relationship between the first UE and the associated UE that is with respect to a first service;

whether the associated UE is exempt from security verification; and a first configuration module 602, configured to configure a second common logical layer corresponding to the associated UE for the first service, and transmit first configuration information to the first UE and the associated UE to configure the associated UE, where the first configuration information includes at least one of layer 2 configuration information, physical resource information, or configuration information of a first common logical layer between the first UE and the associated UE.

Optionally, the association relationship between the first UE and the associated UE that is with respect to the first service includes at least one of the following: aggregation-based transmitting, abnormal handover between UEs, or normal handover between UEs.

Optionally, the associated UE further includes a second UE, and the radio access network node further includes:

a second configuration module, configured to: in case that the association relationship between the first UE and the second UE that is with respect to the first service includes the abnormal handover between UEs, determine an abnormal handover scheme between the first UE and the second UE for the first service according to the latency information of the first link between the first UE and the second UE and a first quality of service requirement of the first service, and transmit second configuration information to the first UE to configure the abnormal handover scheme between the first UE and the second UE, where the second configuration information includes configuration of the abnormal handover scheme between the first UE and the second UE; or, a second reception module, configured to receive first indication information transmitted by the first UE, where the first indication information is used for indicating an abnormal handover scheme between the first UE and the second UE for the first service.

Optionally, the abnormal handover scheme includes a first abnormal handover scheme and a second abnormal handover scheme;

the first abnormal handover scheme includes:

in the downlink direction, transmitting, through the second common logical layer on a side of the radio access network node, downlink data of the first service to the UE currently executing the first service, and in response to abnormality occurring to the UE currently executing the first service, changing the UE currently executing the first service from the source UE to the target UE, and through the second common logical layer, performing at least one of the following functional processing: serial number alignment, redundancy check, data ordering, data sequential transmission and/or sequential delivery and the like on the downlink data, and transmitting the downlink data to the target UE; and in the uplink direction, transmitting, by the UE currently executing the first service, uplink data of the first service to the radio access network node, and in response to abnormality occurring to the UE currently executing the first service, changing the UE currently executing the first service from the source UE to the target UE, and transmitting, by the target UE, the uplink data to the radio access network node, where the source UE and the target UE perform at least one of the following functional processing: serial number alignment, redundancy check, data ordering, data sequential transmission and/or sequential delivery and the like on the uplink data through the first common logical layer, where the source UE is one of the first UE and the second UE, and the target UE is another UE of the first UE and the second UE;

the second abnormal handover scheme includes:

in the downlink direction, transmitting, through the second common logical layer on a side of the radio access network node, downlink data of the first service to the first UE and the second UE, and in response to abnormality occurring to the source UE, changing the UE currently executing the first service from the source UE to the target UE, and through the second common logical layer, performing at least one of the following functional processing: serial number alignment, redundancy check, data ordering, data sequential transmission and/or sequential delivery and the like on the downlink data, where only the UE currently executing the first service parses the downlink data received by the first common logical layer; and in the uplink direction, transmitting, by the UE currently executing the first service, uplink data of the first service to the first common logical layer, transmitting, through the first common logical layer, the uplink data to the associated UE having the association relationship, and, in response to abnormality occurring to the UE currently executing the first service, changing the UE currently executing the first service from the source UE to the target UE, where only the UE currently executing the first service transmits the uplink data to the radio access network node.

Optionally, in the downlink direction, the transmitting, through the second common logical layer on the side of the radio access network node, the downlink data of the first service to the first UE and the second UE specifically includes: transmitting, by the second common logical layer on the side of the radio access network node, the downlink data of the first service to the first UE and the second UE by using one PDSCH scrambled by an RNTI shared by the first UE and the second UE.

Optionally, the first abnormal handover scheme and/or the second abnormal handover scheme includes: in the downlink direction, after the change of the UE currently executing the first service, transmitting, by the source UE of the first service, the downlink data of the first service to the target UE through the first common logical layer.

Optionally, the radio access network node further includes: a third configuration module, configured to: before receiving the first information, transmit third configuration information to the first UE, where the third configuration information is used for configuring and establishing a public tunnel and an air interface radio bearer for the first service, to enable the first UE to establish a public tunnel between the first UE and the core network and an air interface radio bearer between the first UE and the radio access network node for the first service.

Optionally, the third configuration module is further configured to:

in case that the first UE is the UE currently executing the first service, establish an RRC connection with the first UE, and transmit third configuration information to the first UE via the RRC connection;

in case that the first UE has an association relationship with the UE currently executing the first service, and no RRC connection is established between the first UE and the radio access network node, transmit, through the UE currently executing the first service, the third configuration information and a scheduling identifier to the first UE.

Optionally, the radio access network node further includes:

a third reception module, configured to receive second information transmitted by the first UE, where the second information includes at least one of the following:

an identifier of a third UE, where the third UE is a UE that is newly added during execution of the first service and has an association relationship with the first UE;

a type of the first link between the first UE and the third UE;

latency information of the first link between the first UE and the third UE;

an association relationship between the first UE and the third UE that is with respect to the first service;

whether the third UE is exempt from security verification; and a fourth configuration module, configured to update configuration of the second common logical layer for the first service, and transmit fourth configuration information to the first UE and the associated UE, where the fourth configuration information includes at least one of layer 2 configuration update information, physical resource update information, or configuration update information of the first common logical layer between the first UE and the associated UE, where a PDCP window and/or an RLC window of the third UE is initialized based on a serial number of a first data packet received by the third UE, or is initialized based on an HFN and/or an SN transmitted by the radio access network node.

Optionally, the radio access network node further includes: a cancellation module, configured to: in case that the first information indicates that the second UE is exempt from security verification, cancel a procedure of triggering establishment of a connection between the second UE and a core network and authentication of the second UE, where a security key, an integrity key and algorithm information used by the second UE are the same as a security key, an integrity key and algorithm information allocated by the core network and the radio access network node to the first UE.

Optionally, in case that the first information does not indicate that the second UE is exempt from security verification, third information and fourth information of the second UE are allocated to the second UE by a core network and the radio access network node respectively; or, third information allocated by a core network is shared by the second UE and the first UE, and fourth information of the second UE is allocated by the radio access network node to the second UE;

where the third information includes at least one of a NAS security key, a NAS integrity key, or NAS algorithm information; the fourth information includes at least one of an AS security key, an AS integrity key, or AS algorithm information.

Optionally, the radio access network node further includes: a decryption module, configured to: in case that the association relationship between the first UE and the second UE is the aggregation-based transmitting, after receiving uplink data transmitted by the second UE, perform decryption by using the fourth information of the second UE, and then perform decryption by using the fourth information of the first UE, to obtain decrypted uplink data.

It should be noted that the device in the embodiment corresponds to the above method shown in FIG. 3, all the implementations in the above embodiments are applicable to the embodiment of the device, and the same technical effect can also be achieved. The above device provided by the embodiment of the present disclosure can implement all the method steps implemented in the above method embodiments, and can achieve the same technical effect. Therefore, the description and the beneficial effect of the embodiment that are the same as the method embodiments will not be repeated here in detail.

Figure 7:
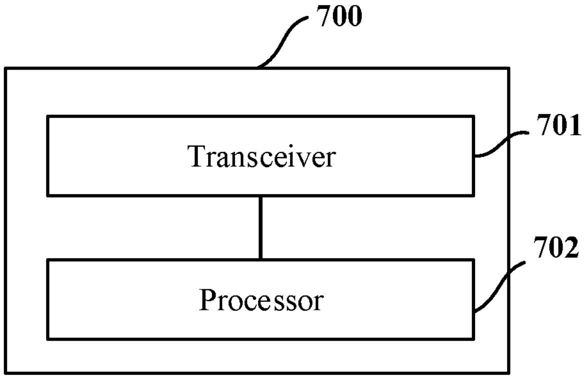
FIG. 7 is a schematic structural diagram of a network device according to another embodiment of the present disclosure.

Referring to FIG. 7, an embodiment of the present disclosure further provides a radio access network node 700, which includes: a transceiver 701 and a processor 702.

The transceiver 701 is configured to receive first information transmitted by a first UE, where the first information includes at least one of the following:

an identifier of an associated UE having an association relationship with the first UE, where a quantity of the associated UE is at least one, and a first link for data and/or signaling transmission exists between the first UE and the associated UE;

a type of the first link between the first UE and the associated UE;

latency information of the first link between the first UE and the associated UE;

the association relationship between the first UE and the associated UE that is with respect to a first service;

whether the associated UE is exempt from security verification.

The processor 702 is configured to configure a second common logical layer corresponding to the associated UE for the first service, and transmit first configuration information to the first UE and the associated UE to configure the associated UE, where the first configuration information includes at least one of layer 2 configuration information, physical resource information, or configuration information of a first common logical layer between the first UE and the associated UE.

Optionally, the association relationship between the associated UEs that is with respect to the first service includes at least one of the following: aggregation-based transmitting, abnormal handover between UEs, or normal handover between UEs.

Optionally, the associated UE further includes a second UE, and the processor is further configured to:

in case that the association relationship between the first UE and the second UE that is with respect to the first service includes the abnormal handover between UEs, determine an abnormal handover scheme between the first UE and the second UE for the first service according to the latency information of the first link between the first UE and the second UE and a first quality of service requirement of the first service, and transmit second configuration information to the first UE to configure the abnormal handover scheme between the first UE and the second UE, where the second configuration information includes configuration of the abnormal handover scheme between the first UE and the second UE; or, receive first indication information transmitted by the first UE, where the first indication information is used for indicating an abnormal handover scheme between the first UE and the second UE for the first service.

Optionally, the abnormal handover scheme includes a first abnormal handover scheme and a second abnormal handover scheme;

the first abnormal handover scheme includes:

in the downlink direction, transmitting, through the second common logical layer on a side of the radio access network node, downlink data of the first service to the UE currently executing the first service, and in response to abnormality occurring to the UE currently executing the first service, changing the UE currently executing the first service from the source UE to the target UE, and through the second common logical layer, performing at least one of the following functional processing: serial number alignment, redundancy check, data ordering, data sequential transmission and/or sequential delivery and the like on the downlink data, and transmitting the downlink data to the target UE; and in the uplink direction, transmitting, by the UE currently executing the first service, uplink data of the first service to the radio access network node, and in response to abnormality occurring to the UE currently executing the first service, changing the UE currently executing the first service from the source UE to the target UE, and transmitting, by the target UE, the uplink data to the radio access network node, where the source UE and the target UE perform at least one of the following functional processing: serial number alignment, redundancy check, data ordering, data sequential transmission and/or sequential delivery and the like on the uplink data through the first common logical layer, where the source UE is one of the first UE and the second UE, and the target UE is another UE of the first UE and the second UE;

the second abnormal handover scheme includes:

in the downlink direction, transmitting, through the second common logical layer on a side of the radio access network node, downlink data of the first service to the first UE and the second UE, and in response to abnormality occurring to the source UE, changing the UE currently executing the first service from the source UE to the target UE, and through the second common logical layer, performing at least one of the following functional processing: serial number alignment, redundancy check, data ordering, data sequential transmission and/or sequential delivery and the like on the downlink data, where only the UE currently executing the first service parses the downlink data received by the first common logical layer; and in the uplink direction, transmitting, by the UE currently executing the first service, uplink data of the first service to the first common logical layer, transmitting, through the first common logical layer, the uplink data to the associated UE having the association relationship, and, in response to abnormality occurring to the UE currently executing the first service, changing the UE currently executing the first service from the source UE to the target UE, where only the UE currently executing the first service transmits the uplink data to the radio access network node.

Optionally, in the downlink direction, the transmitting, through the second common logical layer on the side of the radio access network node, the downlink data of the first service to the first UE and the second UE specifically includes: transmitting, by the second common logical layer on the side of the radio access network node, the downlink data of the first service to the first UE and the second UE by using one PDSCH scrambled by an RNTI shared by the first UE and the second UE.

Optionally, the first abnormal handover scheme and/or the second abnormal handover scheme includes: in the downlink direction, after the change of the UE currently executing the first service, transmitting, by the source UE of the first service, the downlink data of the first service to the target UE through the first common logical layer.

Optionally, the processor is further configured to: before receiving the first information, transmit third configuration information to the first UE, where the third configuration information is used for configuring and establishing a public tunnel and an air interface radio bearer for the first service, to enable the first UE to establish a public tunnel between the first UE and the core network and an air interface radio bearer between the first UE and the radio access network node for the first service.

Optionally, the processor is further configured to:

in case that the first UE is the UE currently executing the first service, establish an RRC connection with the first UE, and transmit third configuration information to the first UE via the RRC connection;

in case that the first UE has an association relationship with the UE currently executing the first service, and no RRC connection is established between the first UE and the radio access network node, transmit, through the UE currently executing the first service, the third configuration information and a scheduling identifier to the first UE.

Optionally, the transceiver is further configured to receive second information transmitted by the first UE, where the second information includes at least one of the following:

an identifier of a third UE, where the third UE is a UE that is newly added during execution of the first service and has an association relationship with the first UE;

a type of the first link between the first UE and the third UE;

latency information of the first link between the first UE and the third UE;

an association relationship between the first UE and the third UE that is with respect to the first service;

whether the third UE is exempt from security verification.

The processor is further configured to: update configuration of the second common logical layer for the first service, and transmit fourth configuration information to the first UE and the associated UE, where the fourth configuration information includes at least one of layer 2 configuration update information, physical resource update information, or configuration update information of the first common logical layer between the first UE and the associated UE, where a PDCP window and/or an RLC window of the third UE is initialized based on a serial number of a first data packet received by the third UE, or is initialized based on an HFN and/or an SN transmitted by the radio access network node.

Optionally, the processor is further configured to, in case that the first information indicates that the second UE is exempt from security verification, cancel a procedure of triggering establishment of a connection between the second UE and a core network and authentication of the second UE, where a security key, an integrity key and algorithm information used by the second UE are the same as a security key, an integrity key and algorithm information allocated by the core network and the radio access network node to the first UE.

Optionally, in case that the first information does not indicate that the second UE is exempt from security verification, third information and fourth information of the second UE are allocated to the second UE by a core network and the radio access network node respectively; or, third information allocated by a core network is shared by the second UE and the first UE, and fourth information of the second UE is allocated by the radio access network node to the second UE;

where the third information includes at least one of a NAS security key, a NAS integrity key, or NAS algorithm information; the fourth information includes at least one of an AS security key, an AS integrity key, or AS algorithm information.

Optionally, the processor is further configured to: in case that the association relationship between the first UE and the second UE is the aggregation-based transmitting, perform decryption by using the fourth information of the second UE after receiving uplink data transmitted by the second UE, and then perform decryption by using the fourth information of the first UE, to obtain the decrypted uplink data.

It should be noted that the device in the embodiment corresponds to the above method shown in FIG. 3, all the implementations in the above embodiments are applicable to the embodiment of the device, and the same technical effect can also be achieved. The above device provided by the embodiment of the present disclosure can implement all the method steps implemented in the above method embodiments, and can achieve the same technical effect. Therefore, the description and the beneficial effect of the embodiment that are the same as the method embodiments will not be repeated here in detail.

Figure 8:
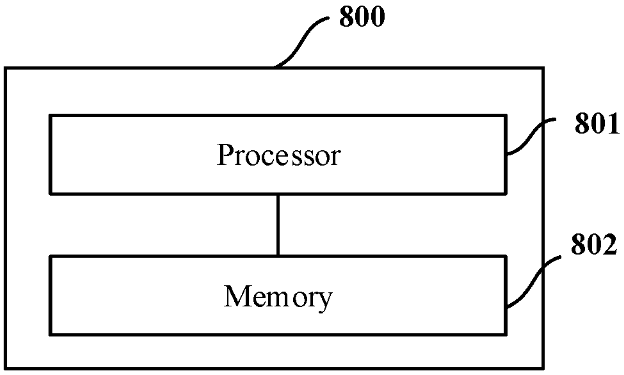
FIG. 8 is a schematic structural diagram of a UE according to still another embodiment of the present disclosure.

Referring to FIG. 8, an embodiment of the present disclosure further provides a user equipment 800, which includes: a processor 801, a memory 802, and a computer program stored in the memory 802 and executable by the processor 801. The computer program, when executed by the processor 801, implements each process of the embodiments of the coordination method for service transmission performed by the UE, and the same technical effect can be achieved, which will not be described herein to avoid repetition.

Figure 9:
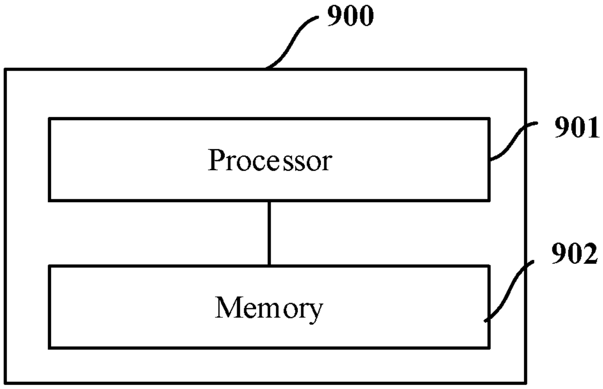
FIG. 9 is a schematic structural diagram of a network device according to still another embodiment of the present disclosure.

Referring to FIG. 9, an embodiment of the present disclosure further provides a radio access network node 900, which includes: a processor 901, a memory 902, and a computer program stored in the memory 902 and executable by the processor 901. The computer program, when executed by the processor 901, implements each process of the embodiments of the coordination method for service transmission performed by the radio access network node, and the same technical effect can be achieved, which will not be described herein to avoid repetition.

An embodiment of the present disclosure further provides a computer-readable storage medium, on which a computer program is stored. The computer program, when executed by a processor, implements each process of the embodiments of the coordination method for service transmission, and the same technical effect can be achieved, which will not be described herein to avoid repetition. The computer-readable storage medium is, for example, a read-only memory (ROM), a random access memory (RAM), a magnetic disk, an optical disc, or the like.

It should be noted that the terms "include", "comprise", or any of their variants in this specification are intended to cover a non-exclusive inclusion, such that a process, a method, an article, or an device that includes a list of elements not only includes those elements, but also includes other elements that are not expressly listed, or includes elements inherent in such process, method, article, or device. In absence of more constraints, an element preceded by the expression "includes a . . . " does not preclude the existence of other identical elements in the process, method, article, or device that includes the element.

From the foregoing description of the embodiments, a person skilled in the art will appreciate clearly that the method according to the embodiments may be implemented not only by software in conjunction with necessary generic hardware platform, but also by hardware, although the former will be preferred in most cases. Based on such an understanding, essential parts, or parts contributing to the related art, of the technical solution of the present disclosure may be implemented in a form of a software product. The computer software product is stored in a storage medium (e.g., ROM/RAM, magnetic disk and optical disc) and includes several instructions adapted to be executed by a terminal (such as a handset, a computer, a server, an air conditioner or a network device) to perform the method according to the embodiments of the present disclosure.

The embodiments of the present disclosure have been described with reference to the accompanying drawings. However, the present disclosure is not limited to the foregoing specific embodiments. The foregoing specific embodiments are merely illustrative rather than restrictive. In light of the teachings of the present disclosure, a person of ordinary skill in the art may further make various forms without departing from the spirit of the present disclosure and the scope of the claims, and these forms all fall within the scope of the present disclosure.

What is claimed is:

1. A coordination method for service transmission, comprising:

transmitting, by a first user equipment (UE), first information to a radio access network node, wherein the first information comprises at least one of the following:

an identifier of an associated UE having an association relationship with the first UE, wherein a quantity of the associated UE is at least one, and a first link for data and/or signaling transmission exists between the first UE and the associated UE;

a type of the first link between the first UE and the associated UE;

latency information of the first link between the first UE and the associated UE;

the association relationship between the first UE and the associated UE that is with respect to a first service; or whether the associated UE is exempt from security verification; and receiving, by the first UE, first configuration information transmitted by the radio access network node, and performing, by the first UE, corresponding configuration according to the first configuration information, wherein the first configuration information comprises at least one of layer 2 configuration information, physical resource information, or configuration information of a first common logical layer between the first UE and the associated UE.

2. The method according to claim 1, wherein the association relationship between the first UE and the associated UE that is with respect to the first service comprises at least one of the following: aggregation-based transmitting, abnormal handover between UEs, normal handover between UEs.

3. The method according to claim 2, wherein the aggregation-based transmitting is to transmit data of the first service to the radio access network node through the associated UE having the association relationship in case that a preset first condition is satisfied, wherein the first condition comprises at least one of the following: uplink data volume of the first service is greater than a first threshold; a signal quality of at least one UE is worse than a second threshold; a transmitting power of at least one UE is lower than a third threshold; a packet error rate of the first service is greater than a fourth threshold;

the abnormal handover is to change a UE currently executing the first service from a source UE to a target UE, to transmit and receive the data of the first service through the target UE, in case that a preset second condition is satisfied; wherein the second condition comprises at least one of the following: the target UE has not received a heartbeat packet from the source UE; the target UE has received a notification message that the source UE is abnormal from the source UE; the target UE has received a notification message that the source UE is abnormal from a network; a higher layer of the target UE has determined that the source UE is abnormal; and the normal handover is to change the UE currently executing the first service from the source UE to the target UE, to transmit and receive the data of the first service through the target UE, in case that a preset third condition is satisfied, wherein the third condition comprises at least one of the following: a higher layer of the target UE instructs that the UE executing the first service is to be changed; a transmitting power of the source UE is lower than a fifth threshold; the transmitting power of the source UE is lower than a sixth threshold, wherein the source UE and the target UE are two different UEs in the associated UE, the first UE is the source UE, or the target UE, or another UE different from the source UE and the target UE.

4. The method according to claim 2, wherein the associated UE comprises a second UE, and in case that the association relationship between the first UE and the second UE that is with respect to the first service comprises the abnormal handover between UEs, the method further comprises:

receiving, by the first UE, second configuration information transmitted by the radio access network node, and configuring, by the first UE, an abnormal handover scheme between the first UE and the second UE according to the second configuration information, wherein the second configuration information comprises a configuration of the abnormal handover scheme between the first UE and the second UE; or, determining, by the first UE according to latency information of the first link between the first UE and the second UE and a first quality of service requirement of the first service, an abnormal handover scheme between the first UE and the second UE for the first service, and transmitting, by the first UE, indication information of the determined abnormal handover scheme to the radio access network node.

5. The method according to claim 4, wherein the abnormal handover scheme comprises a first abnormal handover scheme and a second abnormal handover scheme;

the first abnormal handover scheme comprises:

in a downlink direction, transmitting, through a second common logical layer on a side of the radio access network node, downlink data of the first service to UE currently executing the first service, and in response to abnormality occurring to the UE currently executing the first service, changing the UE currently executing the first service from a source UE to a target UE, and through the second common logical layer, performing serial number alignment processing on the downlink data and transmitting the downlink data to the target UE; and in an uplink direction, transmitting, by the UE currently executing the first service, uplink data of the first service to the radio access network node, and in response to abnormality occurring to the UE currently executing the first service, changing the UE currently executing the first service from the source UE to the target UE, and transmitting, by the target UE, the uplink data to the radio access network node, wherein the source UE and the target UE perform serial number alignment processing on the uplink data through the first common logical layer, wherein the source UE is one of the first UE and the second UE, and the target UE is another UE of the first UE and the second UE;

the second abnormal handover scheme comprises:

in a downlink direction, transmitting, through the second common logical layer on the side of the radio access network node, downlink data of the first service to the first UE and the second UE, and in response to abnormality occurring to the source UE, changing the UE currently executing the first service from the source UE to the target UE, and performing, through the second common logical layer, serial number alignment processing on the downlink data, wherein only the UE currently executing the first service parses the downlink data received by the first common logical layer; and in an uplink direction, transmitting, by the UE currently executing the first service, uplink data of the first service to the first common logical layer, transmitting, through the first common logical layer, the uplink data to the associated UE having the association relationship, and, in response to abnormality occurring to the UE currently executing the first service, changing the UE currently executing the first service from the source UE to the target UE, wherein only the UE currently executing the first service transmits the uplink data to the radio access network node.

6. The method according to claim 5, wherein the first abnormal handover scheme and/or the second abnormal handover scheme further comprises: in the downlink direction, after the change of the UE currently executing the first service, transmitting, by the source UE of the first service, the downlink data of the first service to the target UE through the first common logical layer.

7. The method according to claim 1, wherein, before transmitting the first information to the radio access network node, the method further comprises:

receiving, by the first UE, third configuration information transmitted by the radio access network node, wherein the third configuration information is used for configuring and establishing a public tunnel and an air interface radio bearer for the first service; and establishing, by the first UE, the public tunnel between the first UE and a core network and the air interface radio bearer between the first UE and the radio access network node for the first service according to the third configuration information.

8. The method according to claim 7, wherein, in case that the first UE is the UE currently executing the first service, the first UE establishes a radio resource control (RRC) connection between the first UE and the radio access network node, and receives, via the RRC connection, the third configuration information transmitted by the radio access network node; and in case that the first UE has an association relationship with the UE currently executing the first service, and no RRC connection is established between the first UE and the radio access network node, the first UE receives the third configuration information and a scheduling identifier transmitted by the UE currently executing the first service.

9. The method according to claim 1, further comprising:

transmitting, by the first UE, second information to the radio access network node, wherein the second information comprises at least one of the following:

an identifier of a third UE, wherein the third UE is a UE that is newly added during execution of the first service and has the association relationship with the first UE;

a type of the first link between the first UE and the third UE;

latency information of the first link between the first UE and the third UE;

the association relationship between the first UE and the third UE that is with respect to the first service;

whether the third UE is exempt from security verification; and receiving, by the first UE, fourth configuration information transmitted by the radio access network node, and updating, by the first UE, corresponding configuration according to the fourth configuration information, wherein the fourth configuration information comprises at least one of layer 2 configuration update information, physical resource update information, or configuration update information of the first common logical layer between the first UE and the associated UE, wherein a packet data convergence protocol (PDCP) window and/or a radio link control (RLC) window of the third UE is initialized based on a serial number of a first data packet received by the third UE, or is initialized based on a hyper frame number (HFN) and/or a serial number (SN) transmitted by the radio access network node;

or wherein, in case that the first information indicates that the second UE is exempt from security verification, the method further comprises:

transmitting, by the first UE to the second UE, a security key, an integrity key, and algorithm information allocated to the first UE by a core network and the radio access network node, to enable the second UE to perform data encryption by using the security key, the integrity key, and the algorithm information of the first UE.

10. The method according to claim 1, wherein, in case that the first information does not indicate that the second UE is exempt from security verification, third information and fourth information of the second UE are allocated to the second UE by a core network and the radio access network node respectively; or, third information allocated by the core network is shared by the second UE and the first UE, and fourth information of the second UE is allocated by the radio access network node to the second UE;

wherein the third information comprises at least one of a non-access stratum (NAS) security key, a NAS integrity key, or NAS algorithm information; the fourth information comprises at least one of an access stratum (AS) security key, an AS integrity key, or AS algorithm information.

11. The method according to claim 10, wherein, in case that the association relationship between the first UE and the second UE is the aggregation-based transmitting, uplink data of the first service transmitted by the first UE is encrypted through the fourth information of the first UE, is transmitted to the second UE, is further encrypted through the fourth information of the second UE, and then is transmitted to a side of the radio access network node.

12. A coordination method for service transmission, comprising:

receiving, by a radio access network node, first information transmitted by a first UE, wherein the first information comprises at least one of the following:

an identifier of an associated UE having an association relationship with the first UE, wherein a quantity of the associated UE is at least one, and a first link for data and/or signaling transmission exists between the first UE and the associated UE;

a type of the first link between the first UE and the associated UE;

latency information of the first link between the first UE and the associated UE;

the association relationship between the first UE and the associated UE that is with respect to a first service;

whether the associated UE is exempt from security verification; and configuring, by the radio access network node, a second common logical layer corresponding to the associated UE for the first service, and transmitting, by the radio access network node, first configuration information to the first UE and the associated UE, to configure the associated UE, wherein the first configuration information comprises at least one of layer 2 configuration information, physical resource information, or configuration information of a first common logical layer between the first UE and the associated UE.

13. The method according to claim 12, wherein the association relationship between the first UE and the associated UE that is with respect to the first service comprises at least one of the following: aggregation-based transmitting, abnormal handover between UEs, or normal handover between UEs.

14. The method according to claim 13, wherein the aggregation-based transmitting is to transmit data of the first service to the radio access network node through the associated UE having the association relationship in case that a preset first condition is satisfied, wherein the first condition comprises at least one of the following: uplink data volume of the first service is greater than a first threshold; a signal quality of at least one UE is worse than a second threshold; a transmitting power of at least one UE is lower than a third threshold; a packet error rate of the first service is greater than a fourth threshold;

the abnormal handover is to change a UE currently executing the first service from a source UE to a target UE, to transmit and receive the data of the first service through the target UE, in case that a preset second condition is satisfied; wherein the second condition comprises at least one of the following: the target UE has not received a heartbeat packet from the source UE; the target UE has received a notification message that the source UE is abnormal from the source UE; the target UE has received a notification message that the source UE is abnormal from a network; a higher layer of the target UE has determined that the source UE is abnormal; and the normal handover is to change the UE currently executing the first service from the source UE to the target UE, to transmit and receive the data of the first service through the target UE, in case that a preset third condition is satisfied, wherein the third condition comprises at least one of the following: a higher layer of the target UE instructs that the UE executing the first service is to be changed; a transmitting power of the source UE is lower than a fifth threshold; the transmitting power of the source UE is lower than a sixth threshold, wherein the source UE and the target UE are two different UEs in the associated UE, the first UE is the source UE, or the target UE, or another UE different from the source UE and the target UE.

15. The method according to claim 13, wherein the associated UE further comprises a second UE, and in case that the association relationship between the first UE and the second UE that is with respect to the first service comprises the abnormal handover between UEs, the method further comprises:

determining an abnormal handover scheme between the first UE and the second UE for the first service according to the latency information of the first link between the first UE and the second UE and a first quality of service requirement of the first service, and transmitting second configuration information to the first UE to configure the abnormal handover scheme between the first UE and the second UE, wherein the second configuration information comprises configuration of the abnormal handover scheme between the first UE and the second UE; or, receiving first indication information transmitted by the first UE, wherein the first indication information is used for indicating an abnormal handover scheme between the first UE and the second UE for the first service.

16. The method according to claim 15, wherein the abnormal handover scheme comprises a first abnormal handover scheme and a second abnormal handover scheme;

the first abnormal handover scheme comprises:

in a downlink direction, transmitting, through the second common logical layer on a side of the radio access network node, downlink data of the first service to a UE currently executing the first service, and in response to abnormality occurring to the UE currently executing the first service, changing the UE currently executing the first service from the source UE to the target UE, and performing, through the second common logical layer, serial number alignment processing on the downlink data and transmitting the downlink data to the target UE; and in an uplink direction, transmitting, by the UE currently executing the first service, uplink data of the first service to the radio access network node, and in response to abnormality occurring to the UE currently executing the first service, changing the UE currently executing the first service from the source UE to the target UE, and transmitting, by the target UE, the uplink data to the radio access network node, wherein the source UE and the target UE perform serial number alignment processing on the uplink data through the first common logical layer, wherein the source UE is one of the first UE and the second UE, and the target UE is another UE of the first UE and the second UE;

the second abnormal handover scheme comprises:

in a downlink direction, transmitting, through the second common logical layer on the side of the radio access network node, downlink data of the first service to the first UE and the second UE, and in response to abnormality occurring to the source UE, changing the UE currently executing the first service from the source UE to the target UE, and performing, through the second common logical layer, serial number alignment processing on the downlink data, wherein only the UE currently executing the first service parses the downlink data received by the first common logical layer; and in an uplink direction, transmitting, by the UE currently executing the first service, uplink data of the first service to the first common logical layer, transmitting, through the first common logical layer, the uplink data to the associated UE having the association relationship, and in response to abnormality occurring to the UE currently executing the first service, changing the UE currently executing the first service from the source UE to the target UE, wherein only the UE currently executing the first service transmits the uplink data to the radio access network node.

17. The method according to claim 16, wherein, in the downlink direction, the transmitting, through the second common logical layer on the side of the radio access network node, the downlink data of the first service to the first UE and the second UE specifically comprises:

transmitting, by the second common logical layer on the side of the radio access network node, the downlink data of the first service to the first UE and the second UE by using one physical downlink shared channel (PDSCH) scrambled by a radio network temporary identity (RNTI) shared by the first UE and the second UE;

or wherein the first abnormal handover scheme and/or the second abnormal handover scheme comprises:

in the downlink direction, after the change of the UE currently executing the first service, transmitting, by the source UE of the first service, the downlink data of the first service to the target UE through the first common logical layer.

18. The method according to claim 12, wherein, before receiving the first information, the method further comprises:

transmitting, by the radio access network node, third configuration information to the first UE, wherein the third configuration information is used for configuring and establishing a public tunnel and an air interface radio bearer for the first service, to enable the first UE to establish the public tunnel between the first UE and the core network for the first service, and establish the air interface radio bearer between the first UE and the radio access network node;

or, wherein the method further comprises:

receiving, by the radio access network node, second information transmitted by the first UE, wherein the second information comprises at least one of the following:

an identifier of a third UE, wherein the third UE is a UE that is newly added during execution of the first service and has the association relationship with the first UE;

a type of the first link between the first UE and the third UE;

latency information of the first link between the first UE and the third UE;

the association relationship between the first UE and the third UE that is with respect to the first service;

whether the third UE is exempt from security verification; and updating, by the radio access network node, configuration of the second common logical layer for the first service, and transmitting, by the radio access network node, fourth configuration information to the first UE and the associated UE, wherein the fourth configuration information comprises at least one of layer 2 configuration update information, physical resource update information, or configuration update information of the first common logical layer between the first UE and the associated UE, wherein a PDCP window and/or an RLC window of the third UE is initialized based on a serial number of a first data packet received by the third UE, or is initialized based on an HEN and/or an SN transmitted by the radio access network node;

or, wherein, in case that the first information indicates that the second UE is exempt from security verification, the method further comprises:

cancelling, by the radio access network node, a procedure of triggering establishment of a connection between the second UE and a core network and authentication of the second UE, wherein a security key, an integrity key and algorithm information used by the second UE are the same as a security key, an integrity key and algorithm information allocated by the core network and the radio access network node to the first UE;

or wherein, in case that the first information does not indicate that the second UE is exempt from security verification third information and fourth information of the second UE are allocated to the second UE by a core network and the radio access network node respectively; or third information allocated by a core network is shared by the second UE and the first UE, and fourth information of the second UE is allocated by the radio access network node to the second UE;

wherein the third information comprises at least one of a NAS security key, a NAS integrity key, or NAS algorithm information; the fourth information comprises at least one of an AS security key, an AS integrity key, or AS algorithm information.

19. A radio access network node, comprising: a processor, a memory, and a program stored in the memory and executable by the processor, wherein the program is configured to be executed by the processor to perform steps of the method according to claim 12.

20. A user equipment, the user equipment being a first UE, comprising: a processor, a memory, and a program stored in the memory and executable by the processor, wherein the program is configured to be executed by the processor to perform the following steps;

transmitting first information to a radio access network node, wherein the first information comprises at least one of the following:

an identifier of an associated UE having an association relationship with the first UE, wherein a quantity of the associated UE is at least one, and a first link for data and/or signaling transmission exists between the first UE and the associated UE;

a type of the first link between the first UE and the associated UE;

latency information of the first link between the first UE and the associated UE;

the association relationship between the first UE and the associated UE that is with respect to a first service; or whether the associated UE is exempt from security verification; and receiving first configuration information transmitted by the radio access network node, and performing corresponding configuration according to the first configuration information, wherein the first configuration information comprises at least one of layer 2 configuration information, physical resource information, or configuration information of a first common logical layer between the first UE and the associated UE.

* * * * *